(12) United States Patent
Imomoto et al.

(10) Patent No.: US 10,687,031 B2
(45) Date of Patent: Jun. 16, 2020

(54) INFORMATION PROCESSING METHOD, INFORMATION PROCESSING APPARATUS, AND RECORDING MEDIUM STORING INFORMATION PROCESSING PROGRAM

(71) Applicant: Panasonic Intellectual Property Corporation of America, Torrance, CA (US)

(72) Inventors: Seiya Imomoto, Hyogo (JP); Shunsuke Kuhara, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 16/058,521

(22) Filed: Aug. 8, 2018

(65) Prior Publication Data

US 2019/0068925 A1 Feb. 28, 2019

(30) Foreign Application Priority Data

Aug. 30, 2017 (JP) .................................. 2017-165085

(51) Int. Cl.
*H04N 7/18* (2006.01)
*H04N 5/77* (2006.01)
*G06K 9/00* (2006.01)

(52) U.S. Cl.
CPC ......... *H04N 7/188* (2013.01); *G06K 9/00845* (2013.01); *H04N 5/77* (2013.01)

(58) Field of Classification Search
CPC ............ H04N 7/18; H04N 7/188; H04N 5/77; G06K 9/00845

USPC .............................. 348/148; 340/439, 426.11
See application file for complete search history.

(56) References Cited

U.S. PATENT DOCUMENTS

| | | | | |
|---|---|---|---|---|
| 6,690,294 B1* | 2/2004 | Zierden | ................... | G08G 1/052 340/933 |
| 7,800,486 B2* | 9/2010 | Kaneiwa | ................... | B60R 1/00 340/426.11 |
| 7,930,096 B2* | 4/2011 | Kubota | .................. | B60Q 9/008 340/575 |
| 8,140,241 B2* | 3/2012 | Takeda | .................. | B60W 30/16 701/70 |

(Continued)

FOREIGN PATENT DOCUMENTS

| | | |
|---|---|---|
| JP | 2006-277058 | 10/2006 |
| JP | 2013-117777 | 6/2013 |

*Primary Examiner* — Trang U Tran
(74) *Attorney, Agent, or Firm* — Greenblum & Bernstein, P.L.C.

(57) ABSTRACT

A computer implemented information processing method includes acquiring a first photographed image that represents an inside portion of a vehicle, identifying a driver who drives the vehicle from the first photographed image, acquiring driver information that indicates at least one of an attribute of the identified driver and a driving history of the identified driver. Then the method determines whether or not the identified driver satisfies a condition of experienced driver using the driver information. Finally the method decides a threshold value that is used for detection of occurrence of an event to be a trigger of photographing or recording of a second photographed image which represents an outside portion of the vehicle based on a result of the determination.

20 Claims, 13 Drawing Sheets

(56) References Cited

U.S. PATENT DOCUMENTS 8,761,962 B2 * 6/2014 Seok ................. B60K 35/00
                                                                        701/2
9,156,352 B2 * 10/2015 Kim .................. B60K 28/066

* cited by examiner

INFORMATION PROCESSING METHOD, INFORMATION PROCESSING APPARATUS, AND RECORDING MEDIUM STORING INFORMATION PROCESSING PROGRAM

BACKGROUND

1. Technical Field

The present disclosure relates to an information processing method, an information processing apparatus, and a recording medium storing an information processing program that record only photographed images in which an abnormal situation is photographed among photographed images in which an outside portion of a vehicle is photographed.

2. Description of the Related Art

In related art, an event data recorder has been known which assesses that a dangerous situation which is referred to as near miss and does not actually result in an accident occurs in a case where an acceleration of a vehicle exceeds a predetermined threshold value and which stores image information which is photographed in a time around the time point when the dangerous situation occurs (for example, see Japanese Unexamined Patent Application Publication No. 2013-117777).

Further, techniques for detecting occurrence of a dangerous situation are disclosed in Japanese Unexamined Patent Application Publication No. 2006-277058, for example. Japanese Unexamined Patent Application Publication No. 2006-277058 discloses a safety apparatus that specifies individual drivers by radio frequency (RF) tags, acquires driving characteristics such as a vehicle speed and frequencies of brake and acceleration operations, present physical conditions of a driver such as attentiveness of the driver, and environment information such as road types, and performs danger forecast assessment based on those.

SUMMARY

However, in Japanese Unexamined Patent Application Publication No. 2013-117777, image information stored by an event data recorder may include image information that actually does not display a dangerous situation, and a further improvement has been requested.

Further, in Japanese Unexamined Patent Application Publication No. 2006-277058, detection may be made which indicates that a dangerous situation occurs despite the fact that a dangerous situation does not occur, and a further improvement has been requested.

One non-limiting and exemplary embodiment provides an information processing method, an information processing apparatus, and a recording medium storing an information processing program that may inhibit recording of a photographed image in which a situation other than an abnormal situation which occurs to a vehicle is photographed.

In one general aspect, the techniques disclosed here feature a computer implemented information processing method including: acquiring a first photographed image that displays an inside portion of a vehicle using a processor; identifying a driver who drives the vehicle from the first photographed image using the processor; acquiring driver information that indicates at least one of an attribute of the identified driver and a driving history of the identified driver using the processor; using the driver information to perform a first assessment about whether or not the identified driver satisfies a condition of experienced driver using the processor; and deciding a threshold value that is used for detection of occurrence of an event to be a trigger of photographing or recording of a second photographed image which displays an outside portion of the vehicle based on a result of the first assessment, using the processor.

The techniques of the present disclosure may inhibit recording of a photographed image in which a situation other than an abnormal situation which occurs to a vehicle is photographed.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

Figure 1:
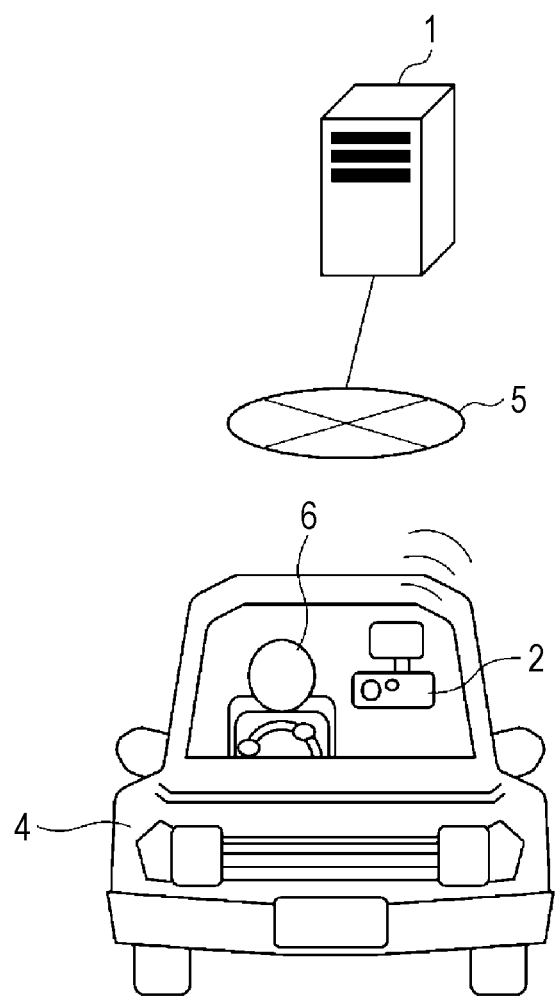
FIG. 1 is a diagram that conceptually illustrates a general configuration of a system in a first embodiment.

DETAILED DESCRIPTION (Underlying Knowledge Forming Basis of the Present Disclosure)

An event data recorder in related art assesses that a dangerous situation occurs under a condition in which the acceleration of a vehicle simply once exceeds a predetermined threshold value and may thus assess that a dangerous situation occurs even in a case where a high acceleration is temporarily detected due to noise or a disturbance in travel, that is, in a situation that is not a dangerous situation. Thus, image information stored by the event data recorder in related art may include image information of a scene in which a dangerous situation actually does not occur.

Further, in the above safety apparatus, for example, in a case where a driver is not accustomed to a vehicle to be driven, the above-described noise or the like occurs to information as an input for a danger prediction process, and detection that indicates that a dangerous situation occurs may be made despite the fact that a dangerous situation does not occur.

A computer implemented information processing method according to one aspect of the present disclosure includes: acquiring a first photographed image that displays an inside portion of a vehicle using a processor; identifying a driver who drives the vehicle from the first photographed image using the processor; acquiring driver information that indicates at least one of an attribute of the identified driver and a driving history of the identified driver using the processor; using the driver information to perform a first assessment about whether or not the identified driver satisfies a condition of experienced driver using the processor; and deciding a threshold value that is used for detection of occurrence of an event to be a trigger of photographing or recording of a second photographed image which displays an outside portion of the vehicle based on a result of the first assessment, using the processor.

In this configuration, the first photographed image that displays the inside portion of the vehicle is acquired. The driver who drives the vehicle is identified from the first photographed image. The driver information that indicates at least one of the attribute of the identified driver and the driving history of the identified driver is acquired. The first assessment about whether or not the identified driver satisfies the condition of experienced driver is performed by using the driver information. The threshold value that is used for detection of occurrence of the event to be the trigger of photographing or recording of the second photographed image which displays the outside portion of the vehicle is decided based on the result of the first assessment.

Consequently, the threshold value that is used for detection of occurrence of the event to be the trigger of photographing or recording of the second photographed image which displays the outside of the vehicle is decided based on the result of the first assessment about whether or not the driver satisfies the condition of experienced driver. Thus, occurrence of the event may certainly be detected, and recording of a photographed image in which a situation other than an abnormal situation which occurs to the vehicle is photographed may be inhibited.

Further, the information processing method may further include transmitting the threshold value to a recording apparatus that photographs the outside portion of the vehicle and records the second photographed image which is generated by photographing by using the threshold value.

In this configuration, the threshold value is transmitted to the recording apparatus that photographs the outside portion of the vehicle and records the second photographed image which is generated by photographing by using the threshold value. Consequently, because it is sufficient that only the threshold value is transmitted, the communication amount may be reduced.

Further, the information processing method may further include: acquiring the second photographed image and sensing information from a photographing apparatus that photographs the outside portion of the vehicle and generates the second photographed image; assessing whether or not the acquired second photographed image is recorded by using the threshold value and the sensing information; and recording the second photographed image in a case where an assessment is made that the second photographed image is recorded.

In this configuration, the second photographed image and the sensing information are acquired from the photographing apparatus that photographs the outside portion of the vehicle and generates the second photographed image. Whether or not the acquired second photographed image is recorded is assessed by using the threshold value and the sensing information. In a case where an assessment is made that the second photographed image is recorded, the second photographed image is recorded.

Consequently, because the second photographed image that is acquired from the photographing apparatus is recorded, missing of the second photographed image in a record may be prevented, and the second photographed image may more accurately be recorded.

Further, in the information processing method, the first assessment may include assessing whether or not the identified driver is an owner of the vehicle.

In this configuration, in the first assessment, whether or not the identified driver is the owner of the vehicle is assessed.

Consequently, in a case where the driver is the owner of the vehicle, the driver may be estimated to be an experienced driver who is accustomed to driving the vehicle, and the driver may easily be assessed as satisfying the condition of experienced driver.

Further, in the information processing method, in a case where the identified driver is assessed as the owner of the vehicle, the threshold value by which occurrence of the event is more likely detected than a reference threshold value may be decided.

In this configuration, in a case where the identified driver is assessed as the owner of the vehicle, the threshold value by which occurrence of the event is more likely detected than the reference threshold value is decided. Thus, unnecessary event detection about an experienced driver may be inhibited, and missing of the event in the event detection may be inhibited.

Further, in the information processing method, in a case where the identified driver is assessed as not the owner of the vehicle, the threshold value by which occurrence of the event is less likely detected than a reference threshold value may be decided.

In this configuration, in a case where the identified driver is assessed as not the owner of the vehicle, the threshold value by which occurrence of the event is less likely detected than the reference threshold value is decided. Thus, unnecessary event detection about a beginner driver may be inhibited, and missing of the event in the event detection may be inhibited.

Further, in the information processing method, the first assessment may include assessing whether or not a cumulative driving number of times of the vehicle of the identified driver is a predetermined time or more or whether or not a cumulative driving distance of the vehicle of the identified driver is a predetermined distance or more.

In this configuration, in the first assessment, whether or not the cumulative driving number of times of the vehicle of the identified driver is the predetermined time or more or whether or not the cumulative driving distance of the vehicle of the identified driver is the predetermined distance or more is assessed.

Consequently, in a case where the cumulative driving number of times in which the driver drives the vehicle is the predetermined time or more or a case where the cumulative driving distance in which the driver drives the vehicle is the predetermined distance or more, the driver may be estimated to be an experienced driver who is accustomed to driving the vehicle, and the driver may easily be assessed as satisfying the condition of experienced driver.

Further, in the information processing method, in a case where the cumulative driving number of times is assessed as the predetermined time or more or the cumulative driving distance is assessed as the predetermined distance or more, the threshold value by which occurrence of the event is more likely detected than a reference threshold value may be decided.

In this configuration, in a case where the cumulative driving number of times is assessed as the predetermined time or more or the cumulative driving distance is assessed as the predetermined distance or more, the threshold value by which occurrence of the event is more likely detected than the reference threshold value is decided. Thus, unnecessary event detection about an experienced driver may be inhibited, and missing of the event in the event detection may be inhibited.

Further, in the information processing method, in a case where the cumulative driving number of times is assessed as not the predetermined time or more or the cumulative driving distance is assessed as not the predetermined distance or more, the threshold value by which occurrence of the event is less likely detected than a reference threshold value may be decided.

In this configuration, in a case where the cumulative driving number of times is assessed as not the predetermined time or more or the cumulative driving distance is assessed as not the predetermined distance or more, the threshold value by which occurrence of the event is less likely detected than the reference threshold value is decided. Thus, unnecessary event detection about a beginner driver may be inhibited, and missing of the event in the event detection may be inhibited.

Further, in the information processing method, the first assessment may include assessing whether or not a cumulative driving number of times of the vehicle of the identified driver is a predetermined number of times or more.

In this configuration, in the first assessment, whether or not the cumulative driving number of times of the vehicle of the identified driver is the predetermined number of times or more is assessed.

Consequently, in a case where the cumulative driving number of times in which the driver drives the vehicle is the predetermined number of times or more, the driver may be estimated to be an experienced driver who is accustomed to driving the vehicle, and the driver may easily be assessed as satisfying the condition of experienced driver.

Further, in the information processing method, in a case where the cumulative driving number of times is assessed as the predetermined number of times or more, the threshold value by which occurrence of the event is more likely detected than a reference threshold value may be decided.

In this configuration, in a case where the cumulative driving number of times is assessed as the predetermined number of times or more, the threshold value by which occurrence of the event is more likely detected than the reference threshold value is decided. Thus, unnecessary event detection about an experienced driver may be inhibited, and missing of the event in the event detection may be inhibited.

Further, in the information processing method, in a case where the cumulative driving number of times is assessed as less than the predetermined number of times, the threshold value by which occurrence of the event is less likely detected than a reference threshold value may be decided.

In this configuration, in a case where the cumulative driving number of times is assessed as less than the predetermined number of times, the threshold value by which occurrence of the event is less likely detected than the reference threshold value is decided. Thus, unnecessary event detection about a beginner driver may be inhibited, and missing of the event in the event detection may be inhibited.

Further, the information processing method may further include: identifying an object that accompanies the driver in the vehicle from the first photographed image; acquiring object information that indicates at least one of an attribute and a status of the identified object; using the object information to perform a second assessment about whether or not the identified object is an object that attracts attention of the driver; and changing the decided threshold value in a case where the identified object is assessed as the object that attracts attention of the driver in the second assessment.

In this configuration, the object that accompanies the driver in the vehicle is identified from the first photographed image. The object information that indicates at least one of the attribute and the status of the identified object is acquired. The second assessment about whether or not the identified object is the object that attracts attention of the driver is performed by using the object information. In a case where the identified object is assessed as the object that attracts attention of the driver in the second assessment, the decided threshold value is changed.

Consequently, in a case where the accompanying object is the object that attracts attention of the driver, it is highly possible that the driver may not concentrate on driving. Thus, the threshold value is changed, and occurrence of the event may thereby be detected more certainly.

Further, in the information processing method, the attribute of the object may include a type of the object, the second assessment may include assessing whether or not the type of the identified object is either one of a child or an animal, and in a case where the type of the identified object is assessed as either one of a child or an animal, the threshold value may be changed to a value by which occurrence of the event is less likely detected than the decided threshold value.

In this configuration, the attribute of the object includes the type of the object. In the second assessment, whether or not the type of the identified object is either one of a child or an animal is assessed. In a case where the type of the identified object is assessed as either one of a child or an animal, the threshold value is changed to a value by which occurrence of the event is less likely detected than the decided threshold value.

Consequently, in a case where the type of the accompanying object is either one of a child or an animal, it is highly possible that the driver may not concentrate on driving. Thus, the threshold value is changed to a value by which the occurrence of the event is less likely detected than the decided threshold value, and occurrence of the event may thereby be detected more certainly.

Further, in the information processing method, the status of the object may include a state of the object, presence or absence of an action, or a content of an action, the second assessment may include assessing whether the state of the identified object is a predetermined state, assessing whether the identified object is moving, or assessing whether the action of the identified object is a predetermined action, and in a case where the state of the object is assessed as the predetermined state, a case where the object is assessed as moving, or a case where the action of the object is assessed as the predetermined action, the threshold value may be changed to a value by which occurrence of the event is less likely detected than the decided threshold value.

In this configuration, the status of the object includes the state of the object, presence or absence of an action, or the content of an action. In the second assessment, whether the state of the identified object is the predetermined state, whether the identified object is moving, or whether the action of the identified object is the predetermined action is assessed. In a case where the state of the object is assessed as the predetermined state, a case where the object is assessed as moving, or a case where the action of the object is assessed as the predetermined action, the threshold value is changed to a value by which occurrence of the event is less likely detected than the decided threshold value.

Consequently, in a case where the state of the object is the predetermined state, a case where the object is moving, or a case where the action of the object is the predetermined action, it is highly possible that the driver may not concentrate on driving. Thus, the threshold value is changed to a value by which the occurrence of the event is less likely detected than the decided threshold value, and occurrence of the event may thereby be detected more certainly.

Further, the information processing method may further include: acquiring driving situation information that indicates a driving situation of the driver; using the driving situation information to perform a third assessment about whether or not the driving situation of the identified driver is a predetermined situation; and changing the decided threshold value in a case where the driving situation of the identified driver is assessed as the predetermined situation in the third assessment.

In this configuration, the driving situation information that indicates the driving situation of the driver is acquired. The third assessment about whether or not the driving situation of the identified driver is the predetermined situation is performed by using the driving situation information. In a case where the driving situation of the identified driver is assessed as the predetermined situation in the third assessment, the decided threshold value is changed.

Consequently, the threshold value is changed in consideration of the driving situation of the driver, and occurrence of the event may thereby be detected more certainly.

Further, in the information processing method, the driving situation information may include at least one of a continuous driving time of the vehicle, a continuous driving distance of the vehicle, and an event occurrence number of times in which the events occur during driving of the vehicle, the third assessment may include assessing at least one of whether or not the continuous driving time reaches a predetermined time, whether or not the continuous driving distance reaches a predetermined distance, and whether or not the event occurrence number of times during the driving reaches a predetermined number of times, and the changing of the threshold value may include changing the decided threshold value in a case where the continuous driving time is assessed as reaching the predetermined time, a case where the continuous driving distance is assessed as reaching the predetermined distance, or a case where the event occurrence number of times during the driving is assessed as reaching the predetermined number of times.

In this configuration, the driving situation information includes at least one of the continuous driving time of the vehicle, the continuous driving distance of the vehicle, and the event occurrence number of times in which the events occur during driving of the vehicle. In the third assessment, at least one of whether or not the continuous driving time reaches the predetermined time, whether or not the continuous driving distance reaches the predetermined distance, and whether or not the event occurrence number of times during the driving reaches the predetermined number of times is assessed. In the changing of the threshold value, the decided threshold value is changed in a case where the continuous driving time is assessed as reaching the predetermined time, a case where the continuous driving distance is assessed as reaching the predetermined distance, or a case where the event occurrence number of times during the driving is assessed as reaching the predetermined number of times.

Consequently, in a case where the continuous driving time is assessed as reaching the predetermined time, a case where the continuous driving distance is assessed as reaching the predetermined distance, or a case where the event occurrence number of times during the driving is assessed as reaching the predetermined number of times, the threshold value is changed, and occurrence of the event may thereby be detected more certainly.

Further, in the information processing method, the predetermined time may include a first time and a second time that is longer than the first time, the predetermined distance may include a first distance and a second distance that is longer than the first distance, the predetermined number of times may include a first number of times and a second number of times that is more than the first number of times, and the changing of the threshold value may include changing the threshold value to different values between a case where the continuous driving time is assessed as reaching the first time and a case where the continuous driving time is assessed as reaching the second time, changing the threshold value to different values between a case where the continuous driving distance is assessed as reaching the first distance and a case where the continuous driving distance is assessed as reaching the second distance, and changing the threshold value to different values between a case where the event occurrence number of times during the driving is assessed as reaching the first number of times and a case where the event occurrence number of times during the driving is assessed as reaching the second number of times.

In this configuration, the predetermined time includes the first time and the second time that is longer than the first time. The predetermined distance includes the first distance and the second distance that is longer than the first distance. The predetermined number of times includes the first number of times and the second number of times that is more than the first number of times. In the changing of the threshold value, the threshold value is changed to different values between a case where the continuous driving time is assessed as reaching the first time and a case where the continuous driving time is assessed as reaching the second time, the threshold value is changed to different values between a case where the continuous driving distance is assessed as reaching the first distance and a case where the continuous driving distance is assessed as reaching the second distance, and the threshold value is changed to different values between a case where the event occurrence number of times during the driving is assessed as reaching the first number of times and a case where the event occurrence number of times during the driving is assessed as reaching the second number of times.

Consequently, even in a case where the situation of the driver changes, unnecessary event detection may be inhibited, and missing of the event in the event detection may be inhibited.

An information processing apparatus according to another aspect of the present disclosure includes: a processor; and a non-transitory recording medium storing thereon a computer program, which when executed by the processor, causes the processor to perform operations including: acquiring a first photographed image that displays an inside portion of a vehicle; identifying a driver who drives the vehicle from the first photographed image; acquiring driver information that indicates at least one of an attribute of the identified driver and a driving history of the identified driver; using the driver information to perform a first assessment about whether or not the identified driver satisfies a condition of experienced driver; and deciding a threshold value that is used for detection of occurrence of an event to be a trigger of photographing or recording of a second photographed image which displays an outside portion of the vehicle based on a result of the first assessment.

In this configuration, the first photographed image that displays the inside portion of the vehicle is acquired. The driver who drives the vehicle is identified from the first photographed image. The driver information that indicates at least one of the attribute of the identified driver and the driving history of the identified driver is acquired. The first assessment about whether or not the identified driver satisfies the condition of experienced driver is performed by using the driver information. The threshold value that is used for detection of occurrence of the event to be the trigger of photographing or recording of the second photographed image which displays the outside portion of the vehicle is decided based on the result of the first assessment.

Consequently, the threshold value that is used for detection of occurrence of the event to be the trigger of photographing or recording of the second photographed image which displays the outside of the vehicle is decided based on the result of the first assessment about whether or not the driver satisfies the condition of experienced driver. Thus, occurrence of the event may certainly be detected, and recording of a photographed image in which a situation other than an abnormal situation which occurs to the vehicle is photographed may be inhibited.

A non-transitory recoding medium according to another aspect of the present disclosure stores thereon a computer program, which when executed by the processor, causes the processor to perform operations including: acquiring a first photographed image that displays an inside portion of a vehicle; identifying a driver who drives the vehicle from the first photographed image; acquiring driver information that indicates at least one of an attribute of the identified driver and a driving history of the identified driver; using the driver information to perform a first assessment about whether or not the identified driver satisfies a condition of experienced driver; and deciding a threshold value that is used for detection of occurrence of an event to be a trigger of photographing or recording of a second photographed image which displays an outside portion of the vehicle based on a result of the first assessment.

In this configuration, the first photographed image that displays the inside portion of the vehicle is acquired. The driver who drives the vehicle is identified from the first photographed image. The driver information that indicates at least one of the attribute of the identified driver and the driving history of the identified driver is acquired. The first assessment about whether or not the identified driver satisfies the condition of experienced driver is performed by using the driver information. The threshold value that is used for detection of occurrence of the event to be the trigger of photographing or recording of the second photographed image which displays the outside portion of the vehicle is decided based on the result of the first assessment.

Consequently, the threshold value that is used for detection of occurrence of the event to be the trigger of photographing or recording of the second photographed image which displays the outside of the vehicle is decided based on the result of the first assessment about whether or not the driver satisfies the condition of experienced driver. Thus, occurrence of the event may certainly be detected, and recording of a photographed image in which a situation other than an abnormal situation which occurs to the vehicle is photographed may be inhibited.

Embodiments of the present disclosure will hereinafter be described with reference to the attached drawings. Note that the following embodiments are examples where the present disclosure is concretized and do not limit the technical scope of the present disclosure.

First Embodiment

In this first embodiment, a method will be described in which a first photographed image which displays an inside portion of a vehicle is acquired, a driver who drives the vehicle is identified from the first photographed image, driver information which indicates at least one of an attribute of the identified driver and a driving history of the identified driver is acquired, a first assessment is performed about whether or not the identified driver satisfies a condition of experienced driver by using the driver information, and a threshold value which is used for detection of occurrence of an event to be a trigger of photographing or recording of a second photographed image which displays an outside portion of the vehicle is decided based on the result of the first assessment.

FIG. 1 is a diagram that conceptually illustrates a general configuration of a system in the first embodiment.

The system illustrated in FIG. 1 includes a management apparatus 1 and a photographing apparatus 2 that is installed in a vehicle 4. The management apparatus 1 is connected with the photographing apparatus 2 via a communication network 5 so as to be capable of communication. The communication network 5 is the Internet, for example.

The management apparatus 1 is a server, for example, and receives the first photographed image that displays the inside portion of the vehicle 4 from the photographing apparatus 2 placed in the vehicle 4 via the communication network 5. Further, the management apparatus 1 decides the threshold value that is used for detection of occurrence of a predetermined event to be the trigger of photographing or recording of the second photographed image which displays the outside portion of the vehicle 4.

The photographing apparatus 2 is an event data recorder, for example, and is installed in the vehicle 4. The photographing apparatus 2 photographs the inside portion of the vehicle 4 and performs photographing in a travel direction, which is the outside portion of the vehicle 4. The photographing apparatus 2 has detection of occurrence of the predetermined event as the trigger and thereby creates event video-recording information that includes photographing data at a specific time point with respect to the time point, at which the occurrence of the predetermined event is detected, as a reference. Specifically, the photographing apparatus 2 records the event video-recording information that includes the photographing data of a third period which includes a first period from the time point when the occurrence of the predetermined event is detected to the time predetermined time earlier than the time point of the detection and a second period from the time point when the occurrence of the predetermined event is detected to the time predetermined time later than the time point of the detection.

In the following, configurations of the management apparatus 1 and the photographing apparatus 2 will be described in detail.

Figure 2:
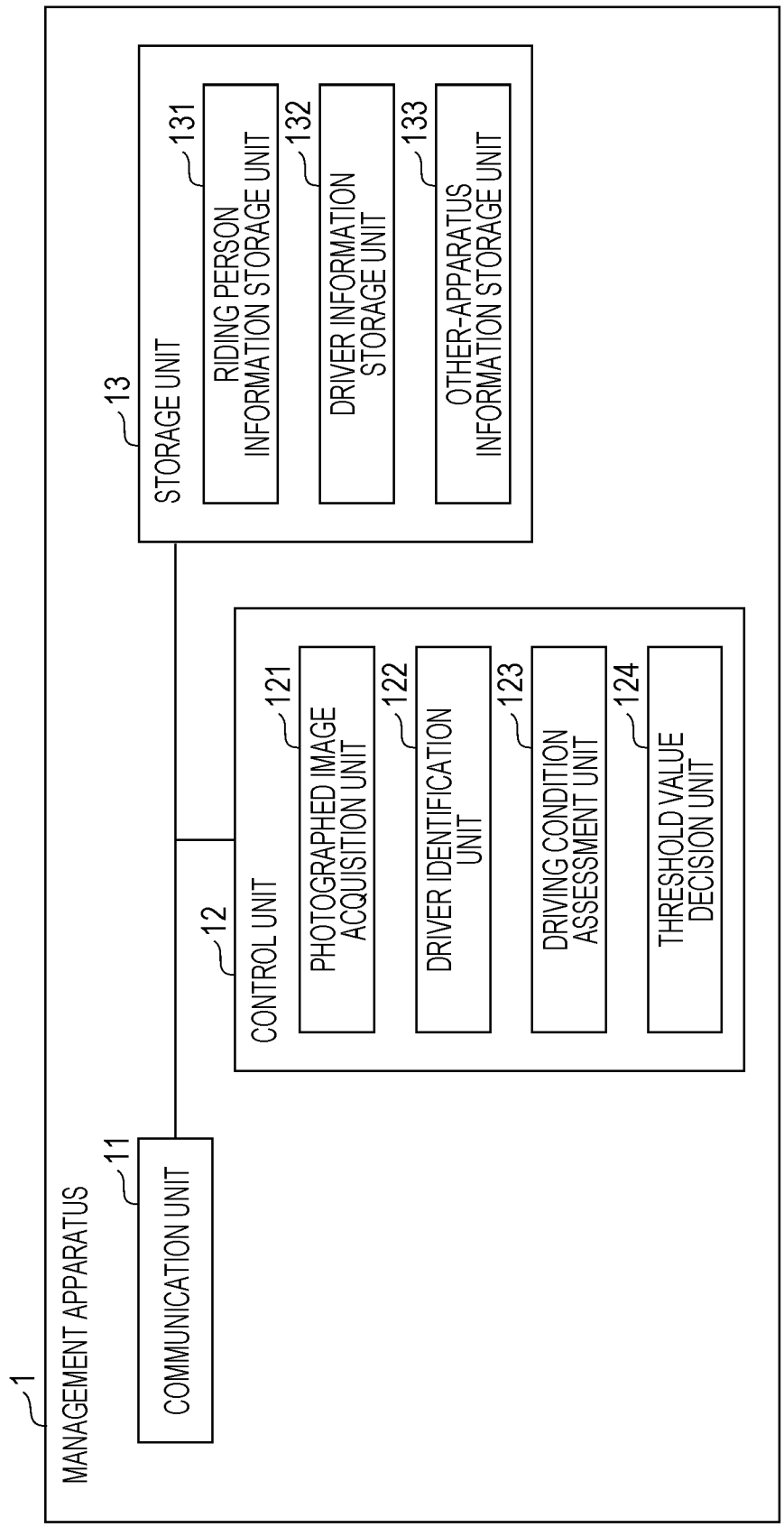
FIG. 2 is a block diagram that illustrates a configuration of a management apparatus in the first embodiment.

FIG. 2 is a block diagram that illustrates a configuration of a management apparatus in the first embodiment.

The management apparatus 1 illustrated in FIG. 2 includes a communication unit 11, a control unit 12, and a storage unit 13.

The communication unit 11 uses wireless or wired communication to perform communication with external apparatuses such as the photographing apparatus 2 via the communication network 5 such as the Internet and to transmit and receive information.

The control unit 12 is a processor, for example, and includes a photographed image acquisition unit 121, a driver identification unit 122, a driving condition assessment unit 123, and a threshold value decision unit 124.

The storage unit 13 is a memory such as a semiconductor memory, for example, and includes a riding person information storage unit 131, a driver information storage unit 132, and an other-apparatus information storage unit 133.

The photographed image acquisition unit 121 acquires the first photographed image that displays an inside portion of the vehicle 4. The communication unit 11 receives the first photographed image that is transmitted by the photographing apparatus 2 and outputs the received first photographed image to the photographed image acquisition unit 121. The photographed image acquisition unit 121 acquires the first photographed image that is transmitted by the photographing apparatus 2 via the communication unit 11. Note that first photographed image information (hereinafter also simply referred to as first photographed image) includes vehicle identification information for identifying the vehicle that acquires the first photographed image.

The riding person information storage unit 131 stores in advance riding person information in which the vehicle identification information for identifying the vehicle 4, riding person identification information for identifying a person who rides the vehicle 4, and a face image of the riding person are associated together. The riding person information is input by a terminal apparatus, which is not illustrated, for example. The terminal apparatus is a smartphone, a tablet type computer, or a personal computer, for example. The terminal apparatus transmits the input riding person information to the management apparatus 1. The communication unit 11 of the management apparatus 1 receives the riding person information that is transmitted by the terminal apparatus and stores the received riding person information in the riding person information storage unit 131.

The driver identification unit 122 identifies the driver who drives the vehicle 4 from the first photographed image. The driver identification unit 122 extracts the face image that is associated with the vehicle identification information included in the first photographed image from the riding person information storage unit 131, picks out the face image of the person who is present in a driver seat portion in the first photographed image, compares this face image with the extracted face image, and identifies the riding person identification information, which is associated with the matching face image, as the driver. Accordingly, the riding person identification information of the driver may be specified.

The driver information storage unit 132 stores in advance the driver information in which the riding person identification information is associated with the vehicle identification information of the vehicle owned by the riding person who is identified by the riding person identification information.

The driving condition assessment unit 123 acquires the driver information that indicates at least one of an attribute of the driver who is identified by the driver identification unit 122 and the driving history of the identified driver and uses the driver information to perform the first assessment about whether or not the identified driver satisfies a condition of experienced driver.

Here, the condition of experienced driver is the fact that the driver is an owner of the vehicle which the driver currently rides. The driving condition assessment unit 123 assesses whether or not the identified driver is the owner of the vehicle. In a case where the driving condition assessment unit 123 assesses that the identified driver is the owner of the vehicle, the driving condition assessment unit 123 assesses that the identified driver satisfies the condition of experienced driver. That is, the driving condition assessment unit 123 assesses whether or not the vehicle identification information of the vehicle owned by the driver who is associated with the riding person identification information of the driver identified by the driver identification unit 122 matches the vehicle identification information included in the first photographed image, that is, the vehicle identification information of the vehicle which the driver rides. In a case where the vehicle identification information of the vehicle owned by the driver matches the vehicle identification information of the vehicle which the driver rides, the driving condition assessment unit 123 assesses that the identified driver satisfies the condition of experienced driver. On the other hand, in a case where the vehicle identification information of the vehicle owned by the driver does not match the vehicle identification information of the vehicle which the driver rides, the driving condition assessment unit 123 assesses that the identified driver does not satisfy the condition of experienced driver.

The threshold value decision unit 124 decides a threshold value that is used for detection of occurrence of the event to be the trigger of photographing or recording of the second photographed image which displays the outside portion of the vehicle 4 based on the result of the first assessment by the driving condition assessment unit 123.

Here, the event indicates various events that do not result in an accident but occur in accordance with occurrence of a near miss incident which might directly lead to an accident depending on a case. An example of the event may include an event in which an excess of the acceleration over the threshold value occurs due to an act of jamming on the brake by the driver. In a case where the identified driver is assessed as satisfying the condition of experienced driver, the threshold value decision unit 124 decides the threshold value with respect to the acceleration of the vehicle as a lower value than an initial value.

In a case where the identified driver is assessed as the owner of the vehicle, the threshold value decision unit 124 decides the threshold value by which occurrence of the event is more likely detected than a reference threshold value. Further, in a case where the identified driver is assessed as not the owner of the vehicle, the threshold value decision unit 124 decides the threshold value by which occurrence of the event is less likely detected than the reference threshold value.

The communication unit 11 transmits the threshold value that is decided by the threshold value decision unit 124 to the photographing apparatus 2.

The other-apparatus information storage unit 133 stores other-apparatus information about other apparatuses such as the photographing apparatus 2. The other-apparatus information includes identification information for identifying the photographing apparatus 2, for example.

Next, a configuration of the photographing apparatus 2 will be described in detail.

Figure 3:
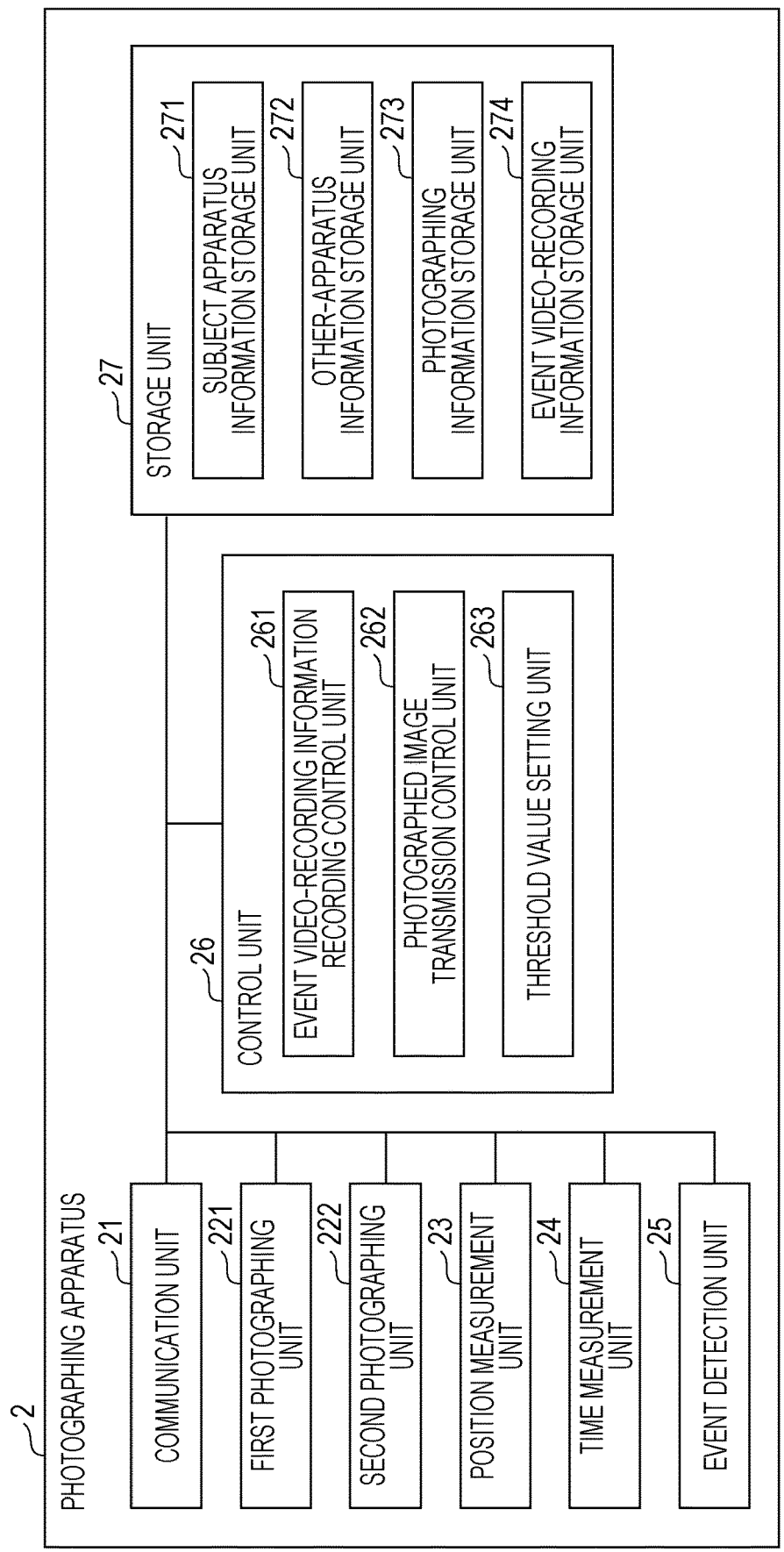
FIG. 3 is a block diagram that illustrates a configuration of a photographing apparatus in the first embodiment.

FIG. 3 is a block diagram that illustrates a configuration of a photographing apparatus in the first embodiment.

The photographing apparatus 2 includes a communication unit 21, a first photographing unit 221, a second photographing unit 222, a position measurement unit 23, a time measurement unit 24, an event detection unit 25, a control unit 26, and a storage unit 27.

The communication unit 21 uses wireless communication to perform communication with the management apparatus 1 via the communication network 5 such as a wide area network (WAN) or the Internet and to perform transmission and reception of information with the management apparatus 1. Note that the communication unit 21 is not limited to this configuration as long as transmission and reception of information with the management apparatus 1 may be performed. For example, the communication unit 21 may perform communication with the management apparatus 1 by causing another apparatus such as a smartphone of the driver to relay the communication and may perform transmission and reception of information with the management apparatus 1.

The first photographing unit 221 is a camera, is installed in the vehicle, and photographs the inside portion of the vehicle. The first photographing unit 221 outputs the first photographed image which displays the inside portion of the vehicle to the communication unit 21 in a case where an engine starts, for example. The communication unit 21 transmits the first photographed image that is taken by the first photographing unit 221 to the management apparatus 1. Note that in the first embodiment, the inside portion of the vehicle is photographed at the timing when the engine starts, and the first photographed image is transmitted to the management apparatus 1. However, the present disclosure is not particularly limited to this, but the first photographed image may be transmitted to the management apparatus 1 at another timing.

Note that the first photographing unit 221 may periodically (for example, once every 30 milliseconds) store the first photographed image which displays the inside portion of the vehicle in a photographing information storage unit 273.

The second photographing unit 222 is a camera, is installed in the vehicle, and photographs the vehicle, surroundings of the vehicle, or the like. The second photographing unit 222 periodically (for example, once every 30 milliseconds) stores the second photographed image which displays the outside portion of the vehicle in the photographing information storage unit 273.

The position measurement unit 23 is a global positioning system (GPS) receiver, for example, and measures position information of the photographing apparatus 2, that is, position information of the vehicle. The position information that is measured by the position measurement unit 23 is used as the position information of the photographing apparatus 2 at the time point when the predetermined event is detected by the event detection unit 25, for example.

The time measurement unit 24 is a clock, for example, and measures the present time. Time information that is measured by the time measurement unit 24 is used as the time information of the time point when the predetermined event is detected by the event detection unit 25, for example. The time information of the time point when the predetermined event is detected by the event detection unit 25 is attached to the event video-recording information as event detection time information.

The event detection unit 25 detects occurrence of the predetermined event. The predetermined event is preset by the driver, a manager of the vehicle, or the like. The event detection unit 25 uses the threshold value for detection of occurrence of the event. In a case of an example of the event in which an excess of the acceleration over the threshold value occurs due to an act of jamming on the brake by the driver, the event detection unit 25 detects that the acceleration exceeds the threshold value. Note that in an initial state, an initial threshold value is set for the event detection unit 25. The threshold value of the event detection unit 25 is changed by a threshold value setting unit 263.

The storage unit 27 is a memory such as a semiconductor memory, for example, and includes a subject apparatus information storage unit 271, an other-apparatus information storage unit 272, the photographing information storage unit 273, and an event video-recording information storage unit 274.

The subject apparatus information storage unit 271 stores subject apparatus information that indicates information about the photographing apparatus 2. The subject apparatus information includes at least photographing apparatus identification information for identifying the photographing apparatus 2. This photographing apparatus identification information is added to transmission information in a case where information is transmitted from the photographing apparatus 2 to the management apparatus 1. For example, in a case where the first photographed image is transmitted from the photographing apparatus 2 to the management apparatus 1, the communication unit 21 adds the photographing apparatus identification information to the first photographed image and transmits the first photographed image to which the photographing apparatus identification information is added. Accordingly, the management apparatus 1 is enabled to recognize from which photographing apparatus 2 the first photographed image is transmitted.

Further, the subject apparatus information storage unit 271 may store the vehicle identification information for identifying the vehicle in which the photographing apparatus 2 is installed. The communication unit 21 may further add the vehicle identification information to the first photographed image and may transmit the first photographed image to which the vehicle identification information is further added.

The other-apparatus information storage unit 272 stores the other-apparatus information that indicates information about the other apparatuses. The other-apparatus information includes at least address information of the management apparatus 1. The photographing apparatus 2 uses the address information that is included in the other-apparatus information in a case where information is transmitted to the management apparatus 1.

The photographing information storage unit 273 stores the second photographed image that is periodically (for example, once every 30 milliseconds) photographed by the second photographing unit 222. Further, the photographing information storage unit 273 may store the first photographed image that is periodically (for example, once every 30 milliseconds) photographed by the first photographing unit 221.

The event video-recording information storage unit 274 stores the event video-recording information in which an event video-recording information recording control unit 261 adds event detection position information and the event detection time information to the second photographed image in a predetermined period around the time point when occurrence of the event is detected.

The control unit 26 is a processor, for example, and includes the event video-recording information recording control unit 261, a photographed image transmission control unit 262, and the threshold value setting unit 263.

In a case where occurrence of the event is detected by using the threshold value, the event video-recording information recording control unit 261 controls recording of the second photographed image at the time point when occurrence of the event is detected. In a case where occurrence of the predetermined event is detected by the event detection unit 25, the event video-recording information recording control unit 261 acquires the position information of the photographing apparatus 2 from the position measurement unit 23 and acquires the present time from the time measurement unit 24. Next, the event video-recording information recording control unit 261 extracts, from the photographing information storage unit 273, the second photographed image in the predetermined period around the time point when occurrence of the event is detected. Then, the event video-recording information recording control unit 261 generates the event video-recording information, which includes the acquired position information and time information respectively as the event detection position information and the event detection time information and includes the extracted second photographed image, and stores the generated event video-recording information in the event video-recording information storage unit 274.

Figure 4:
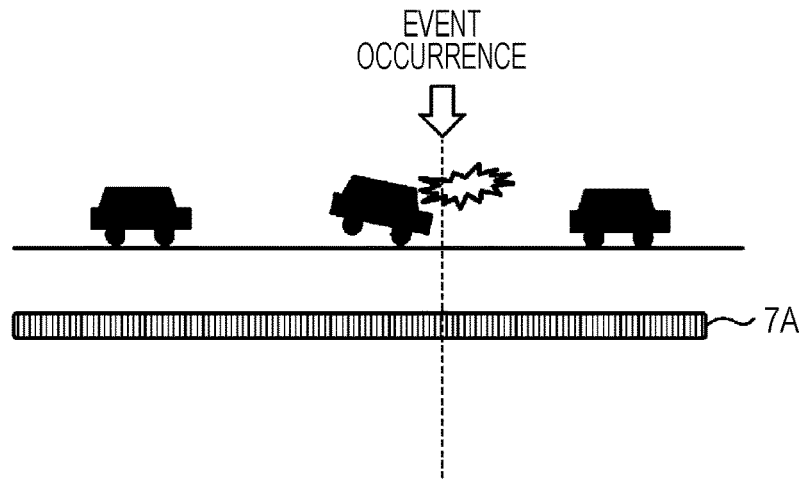
FIG. 4 is a schematic diagram for explaining event video-recording information in the first embodiment.

FIG. 4 is a schematic diagram for explaining the event video-recording information in the first embodiment. The event video-recording information includes the photographing data of a third period 7A which includes the first period from the time point when occurrence of the predetermined event is detected to the time the predetermined time earlier than the time point of the detection and the second period from the time point when occurrence of the predetermined event is detected to the time the predetermined time later than the time point of the detection. Note that the first period is 10 seconds, for example, and the second period is 5 seconds, for example. The third period is 15 seconds, which is the sum of the first period and the second period. The lengths of the first period and the second period are examples and are not limited to the above.

The photographed image transmission control unit 262 transmits the first photographed image that is photographed by the first photographing unit 221 to the management apparatus 1 via the communication unit 21. In a case where the engine of the vehicle is started, the photographed image transmission control unit 262 acquires the first photographed image from the first photographing unit 221 and acquires the vehicle identification information from the subject apparatus information storage unit 271. Then, the photographed image transmission control unit 262 transmits the first photographed image that includes the vehicle identification information to the management apparatus 1.

Note that another example of a timing when the first photographed image is transmitted to the management apparatus 1 may be a case where a transmission instruction input by the driver is received.

The threshold value setting unit 263 sets the threshold value that is used for detection of occurrence of the event in the event detection unit 25. The communication unit 21 receives the threshold value that is transmitted by the management apparatus 1. The threshold value setting unit 263 sets the threshold value that is received by the communication unit 21 for the event detection unit 25.

Figure 5:
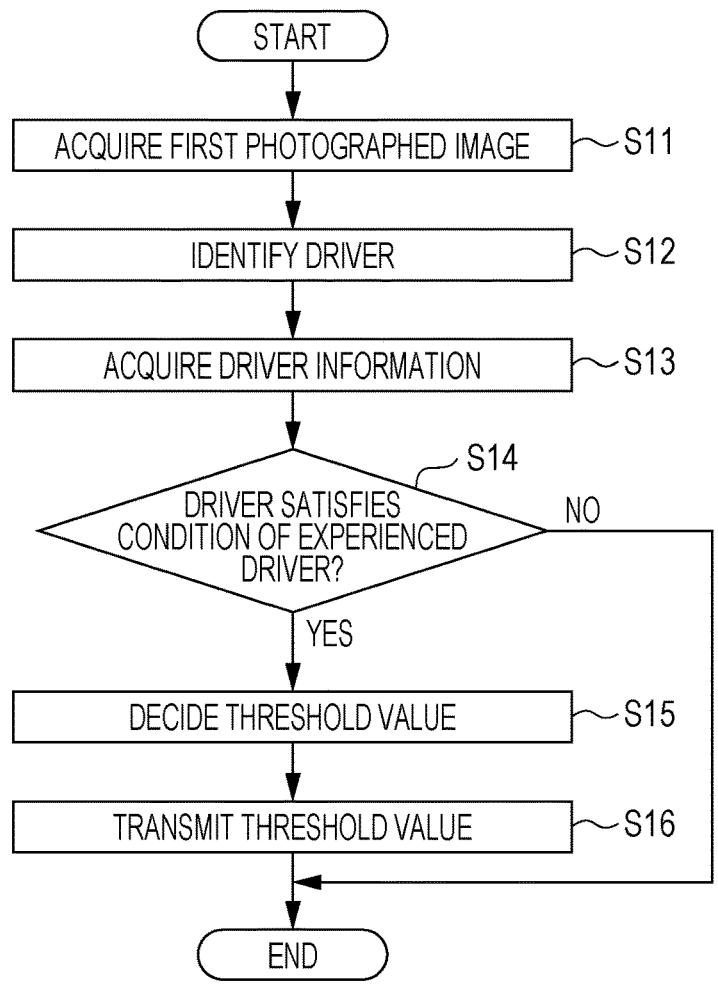
FIG. 5 is a flowchart that illustrates a process of the management apparatus in the first embodiment.

FIG. 5 is a flowchart that illustrates a process of the management apparatus in the first embodiment.

First, the photographed image acquisition unit 121 of the management apparatus 1 acquires the first photographed image from the photographing apparatus 2 (step S11). Specifically, the photographed image acquisition unit 121 acquires the first photographed image, which includes the vehicle identification information for identifying the vehicle 4 and is obtained by photographing the inside portion of the vehicle 4, from the photographing apparatus 2 via the communication unit 11.

Figure 6:
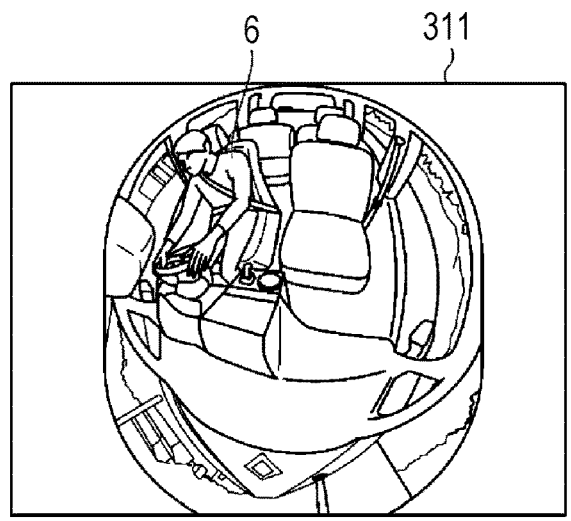
FIG. 6 is a diagram that illustrates one example of a first photographed image that is photographed in the first embodiment.

FIG. 6 is a diagram that illustrates one example of the first photographed image that is photographed in the first embodiment. As illustrated in FIG. 6, a first photographed image 311 is an image that displays the inside portion of the vehicle 4. The first photographing unit 221 performs photographing by using a fisheye lens that is capable of photographing the inside portion of the vehicle 4 in 360 degrees. In the first embodiment, because a driver 6 has to be identified, the first photographing unit 221 performs photographing such that at least the driver 6 is included in the image.

In a case where the engine of the vehicle 4 is started, a case where the photographing apparatus 2 is started, or a case where a moving body is detected in the vehicle 4, the communication unit 21 of the photographing apparatus 2 transmits the first photographed image that is photographed by the first photographing unit 221 to the management apparatus 1.

Returning to FIG. 5, next, the driver identification unit 122 identifies the driver who drives the vehicle 4 from the first photographed image (step S12). The driver identification unit 122 uses an image recognition technique to identify who the driver is among the riding persons who are registered in advance and to specify the riding person identification information of the driver. Note that in a case where the driver may not be identified, that is, a case where the driver is not registered in advance, the process may be finished.

Note that in the first embodiment, the driver who drives the vehicle 4 is identified from the first photographed image. However, the present disclosure is not particularly limited to this, but the riding person information storage unit 131 may store in advance biological information such as fingerprints or an iris of the riding person as the riding person information, and the driver identification unit 122 may acquire the biological information of the driver, compare the biological information acquired from the driver with the riding person information stored in the riding person information storage unit 131, and thereby identify the driver who drives the vehicle 4.

Further, the riding person information storage unit 131 may store in advance the riding person identification information for identifying the riding person as the riding person information, and the photographing apparatus 2 may receive the riding person identification information that is transmitted from a terminal apparatus or an RF tag which is owned by the driver and transmit the received riding person identification information to the management apparatus 1. Then, the driver identification unit 122 may compare the riding person identification information that is received from the photographing apparatus 2 with the riding person information that is stored in the riding person information storage unit 131 and thereby identify the driver who drives the vehicle 4.

Next, the driving condition assessment unit 123 acquires the driver information that corresponds to the riding person identification information of the driver, which is identified by the driver identification unit 122 (step S13). For example, the driver information associates the riding person identification information with the vehicle identification information of the vehicle owned by the riding person who is identified by the riding person identification information.

Next, the driving condition assessment unit 123 assesses whether or not the identified driver satisfies the condition of experienced driver based on the acquired driver information (step S14). Specifically, the driving condition assessment unit 123 refers to the driver information and assesses whether or not the vehicle identification information of the vehicle owned by the driver who is associated with the riding person identification information of the driver identified by the driver identification unit 122 matches the vehicle identification information included in the first photographed image, that is, the vehicle identification information of the vehicle which the driver currently rides.

Note that in the first embodiment, the condition of experienced driver is the fact that the driver is the owner of the vehicle. In a case where the identified driver is the owner of the vehicle, the driving condition assessment unit 123 assesses that the identified driver satisfies the condition of experienced driver. However, the present disclosure is not particularly limited to this.

The condition of experienced driver may be the fact that the cumulative driving number of times in which the driver drives the vehicle is a predetermined time or more. The driving condition assessment unit 123 may assess whether or not the cumulative driving number of times of the vehicle of the identified driver is the predetermined time or more. In a case where the driving condition assessment unit 123 assesses that the cumulative driving number of times of the vehicle of the identified driver is the predetermined time or more, the driving condition assessment unit 123 may assess that the identified driver satisfies the condition of experienced driver. Further, in a case where the cumulative driving number of times of the vehicle of the identified driver is shorter than the predetermined time, the driving condition assessment unit 123 may assess that the identified driver does not satisfy the condition of experienced driver. Furthermore, in a case where the cumulative driving number of times is assessed as the predetermined time or more, the threshold value decision unit 124 may decide the threshold value by which occurrence of the event is more likely detected than the reference threshold value. Further, in a case where the cumulative driving number of times is assessed as not the predetermined time or more, the threshold value decision unit 124 may decide the threshold value by which occurrence of the event is less likely detected than the reference threshold value.

In this case, the driver information associates the riding person identification information with the cumulative driving number of times that indicates the time in which the riding person identified by the riding person identification information has driven the vehicle to the present time. Note that the cumulative driving number of times may be the cumulative driving number of times in which the riding person drives a specific vehicle. In this case, the cumulative driving number of times of the riding person is stored for each vehicle. Further, regardless of the specific vehicle, the cumulative driving number of times may be the cumulative driving number of times in which the riding person drives various vehicles. Further, the photographing apparatus 2 measures the time in which the driver drives and transmits the time to the management apparatus 1. The communication unit 11 of the management apparatus 1 receives the time in which the driver drives from the photographing apparatus 2 and adds the time to the cumulative driving number of times of the driver information.

Further, the condition of experienced driver may be the fact that the cumulative driving distance in which the driver drives the vehicle is a predetermined distance or more. The driving condition assessment unit 123 may assess whether or not the cumulative driving distance of the vehicle of the identified driver is the predetermined distance or more. In a case where the driving condition assessment unit 123 assesses that the cumulative driving distance of the vehicle of the identified driver is the predetermined distance or more, the driving condition assessment unit 123 may assess that the identified driver satisfies the condition of experienced driver. Further, in a case where the cumulative driving distance of the vehicle of the identified driver is shorter than the predetermined distance, the driving condition assessment unit 123 may assess that the identified driver does not satisfy the condition of experienced driver. Furthermore, in a case where the cumulative driving distance is assessed as the predetermined distance or more, the threshold value decision unit 124 may decide the threshold value by which occurrence of the event is more likely detected than the reference threshold value. Further, in a case where the cumulative driving distance is assessed as not the predetermined distance or more, the threshold value decision unit 124 may decide the threshold value by which occurrence of the event is less likely detected than the reference threshold value.

In this case, the driver information associates the riding person identification information with the cumulative driving distance that indicates the distance in which the riding person identified by the riding person identification information has driven the vehicle to the present time. Note that the cumulative driving distance may be the cumulative driving distance in which the riding person drives a specific vehicle. In this case, the cumulative driving distance of the riding person is stored for each vehicle. Further, regardless of the specific vehicle, the cumulative driving distance may be the cumulative driving distance in which the riding person drives various vehicles. Further, the photographing apparatus 2 measures the distance in which the driver drives and transmits the distance to the management apparatus 1. The communication unit 11 of the management apparatus 1 receives the distance in which the driver drives from the photographing apparatus 2 and adds the distance to the cumulative driving distance of the driver information.

Further, the condition of experienced driver may be the fact that the cumulative driving number of times in which the driver drives the vehicle is a predetermined number of times or more. The driving condition assessment unit 123 may assess whether or not the cumulative driving number of times of the vehicle of the identified driver is the predetermined number of times or more. In a case where the driving condition assessment unit 123 assesses that the cumulative driving number of times of the vehicle of the identified driver is the predetermined number of times or more, the driving condition assessment unit 123 may assess that the identified driver satisfies the condition of experienced driver. Further, in a case where the cumulative driving number of times of the vehicle of the identified driver is less than the predetermined number of times, the driving condition assessment unit 123 may assess that the identified driver does not satisfy the condition of experienced driver. Furthermore, in a case where the cumulative driving number of times is assessed as the predetermined number of times or more, the threshold value decision unit 124 may decide the threshold value by which occurrence of the event is more likely detected than the reference threshold value. Further, in a case where the cumulative driving number of times is assessed as less than the predetermined number of times, the threshold value decision unit 124 may decide the threshold value by which occurrence of the event is less likely detected than the reference threshold value.

In this case, the driver information associates the riding person identification information with the cumulative driving number of times that indicates the number of times in which the riding person identified by the riding person identification information has driven the vehicle to the present time. Note that the cumulative driving number of times may be the cumulative driving number of times in which the riding person drives a specific vehicle. In this case, the cumulative driving number of times of the riding person is stored for each vehicle. Further, regardless of the specific vehicle, the cumulative driving number of times may be the cumulative driving number of times in which the riding person drives various vehicles. Further, the photographing apparatus 2 measures the number of times in which the driver drives and transmits the number of times to the management apparatus 1. For example, the photographing apparatus 2 may count an activity of starting the engine to stopping the engine as one time. The communication unit 11 of the management apparatus 1 receives the number of times in which the driver drives from the photographing apparatus 2 and adds the number of times to the cumulative driving number of times of the driver information.

Further, the driver information may associate the riding person identification information with information that indicates whether or not the riding person identified by the riding person identification information is an experienced driver. In this case, in a case where the riding person identification information of the identified driver is associated with information of experienced driver, the driving condition assessment unit 123 may assess that the identified driver satisfies the condition of experienced driver. Further, in a case where the riding person identification information of the identified driver is not associated with the information of experienced driver, the driving condition assessment unit 123 may assess that the identified driver does not satisfy the condition of experienced driver. The terminal apparatus accepts an input about whether or not the riding person is an experienced driver and transmits information that indicates whether or not the riding person is an experienced driver to the management apparatus 1. The communication unit 11 of the management apparatus 1 receives the information that indicates whether or not the riding person is an experienced driver from the photographing apparatus 2 and stores the information while associating the information with the riding person of the driver information.

Further, in a case where the identified driver is assessed as satisfying the condition of experienced driver (YES in step S14), the threshold value decision unit 124 decides the threshold value that is used for detection of occurrence of the event to be the trigger of photographing or recording of the second photographed image which displays the outside portion of the vehicle 4 (step S15). Specifically, in a case where the identified driver is assessed as satisfying the condition of experienced driver, the threshold value decision unit 124 lowers the threshold value.

Figure 7:
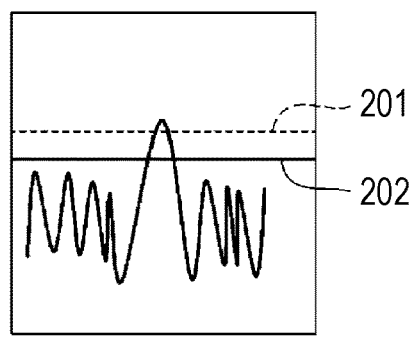
FIG. 7 is a schematic diagram for explaining a threshold value that is decided in a case where the driver satisfies a condition of experienced driver in the first embodiment.

FIG. 7 is a schematic diagram for explaining the threshold value that is decided in a case where the driver satisfies the condition of experienced driver in the first embodiment.

The waveform illustrated in FIG. 7 represents the acceleration of the vehicle. The broken line indicated in FIG. 7 is a preset initial threshold value 201, and the solid line is a threshold value 202 that is decided in a case where the driver satisfies the condition of experienced driver. As illustrated in FIG. 7, in a case where the identified driver is assessed as satisfying the condition of experienced driver, the threshold value decision unit 124 decides the threshold value as the threshold value 202 that is lower than the initial threshold value 201. More specifically, the threshold value decision unit 124 decides the threshold value as the threshold value 202 that is lower than the initial threshold value 201 and is a value which is low to the extent that the change in the acceleration which is not relevant to occurrence of the near miss incident is not detected. Accordingly, the event that occurs in response to occurrence of the near miss incident which tends to be missed in the detection in a case where the driver is an experienced driver may more certainly be detected, and detection of the event that is not relevant to occurrence of the near miss incident may be avoided. Consequently, while a situation in which the near miss incident occurs is recorded, recording of an image in which a situation other than the concerned situation is photographed may be inhibited.

Returning to FIG. 5, next, the communication unit 11 transmits the threshold value that is decided by the threshold value decision unit 124 to the photographing apparatus 2 (step S16).

On the other hand, in a case where the identified driver is assessed as not satisfying the condition of experienced driver (NO in step S14), the threshold value decision unit 124 finishes the process without changing the threshold value.

Note that in the first embodiment, in a case where the identified driver is assessed as not satisfying the condition of experienced driver, the threshold value decision unit 124 may assess that the identified driver is a beginner driver and may decide the threshold value as the threshold value that is higher than the initial threshold value.

Figure 8:
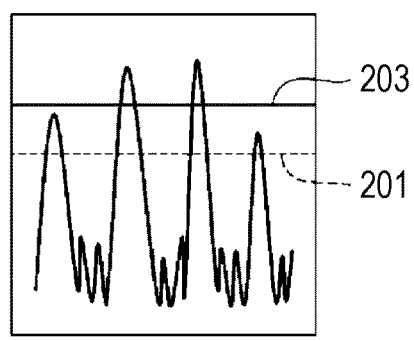
FIG. 8 is a schematic diagram for explaining the threshold value that is decided in a case where the driver does not satisfy the condition of experienced driver in a modification example of the first embodiment.

FIG. 8 is a schematic diagram for explaining the threshold value that is decided in a case where the driver does not satisfy the condition of experienced driver in a modification example of the first embodiment.

The waveform illustrated in FIG. 8 represents the acceleration of the vehicle. The broken line indicated in FIG. 8 is the preset initial threshold value 201, and the solid line is a threshold value 203 that is decided in a case where the driver does not satisfy the condition of experienced driver. As illustrated in FIG. 8, in a case where the identified driver is assessed as not satisfying the condition of experienced driver, the threshold value decision unit 124 decides the threshold value as the threshold value 203 that is higher than the initial threshold value 201. Accordingly, in a case where the driver is the beginner driver, recording of the second photographed image in which a dangerous situation is not photographed may be prevented. That is, the beginner driver may jam on the brake even in a non-dangerous situation, and the acceleration possibly exceeds the initial threshold value 201 even in a non-dangerous situation. Thus, the threshold value decision unit 124 decides the threshold value as the threshold value 203 that is higher than the initial threshold value 201, and only the second photographed image in which a dangerous situation is photographed may thereby be recorded. Further, the threshold value decision unit 124 decides the threshold value as the threshold value 202 that is higher than the initial threshold value 201 and is a value which is high to the extent that the change in the acceleration which occurs in response to occurrence of the near miss incident is detected. Accordingly, the event that occurs in response to occurrence of the near miss incident may also be detected. Consequently, while the situation in which the near miss incident occurs is recorded, recording of the image in which a situation other than the concerned situation is photographed may be inhibited.

Note that in the first embodiment, to what extent the threshold value is lowered is predetermined. However, the present disclosure is not particularly limited to this, but the threshold value decision unit 124 may change the lowering width of the threshold value in accordance with the cumulative driving number of times, the cumulative driving distance, or the cumulative driving number of times.

In the first embodiment, the threshold value that is used for detection of occurrence of the event is decided based on the experience of the driver about the vehicle, and whether or not the photographed image that is photographed by the photographing apparatus 2 is dangerous may thereby accurately be assessed. Accordingly, for example, a person in charge, who checks contents of the event video-recording information and extracts the event video-recording information in which a dangerous situation is photographed, may easily extract only the event video-recording information which is dangerous or whose possibility of danger is high and may thus intend to increase work efficiency.

Further, in the first embodiment, the communication unit 11 of the management apparatus 1 may acquire the second photographed image and sensing information from the photographing apparatus 2 that generates the second photographed image. The control unit 12 may assess whether or not the acquired second photographed image is recorded by using the threshold value and the sensing information. In a case where the control unit 12 assesses that the second photographed image is recorded, the control unit 12 may record the second photographed image in the storage unit 13. In this case, because the second photographed image that is acquired from the photographing apparatus 2 is recorded in the management apparatus 1, missing of the second photographed image in the record may be prevented, and the second photographed image may more accurately be recorded.

Second Embodiment

In the first embodiment, only the driver is identified. However, in a second embodiment, not only the driver but also an object that rides the vehicle together with the driver is identified, and the threshold value is changed in accordance with the kind of the identified object.

Figure 9:
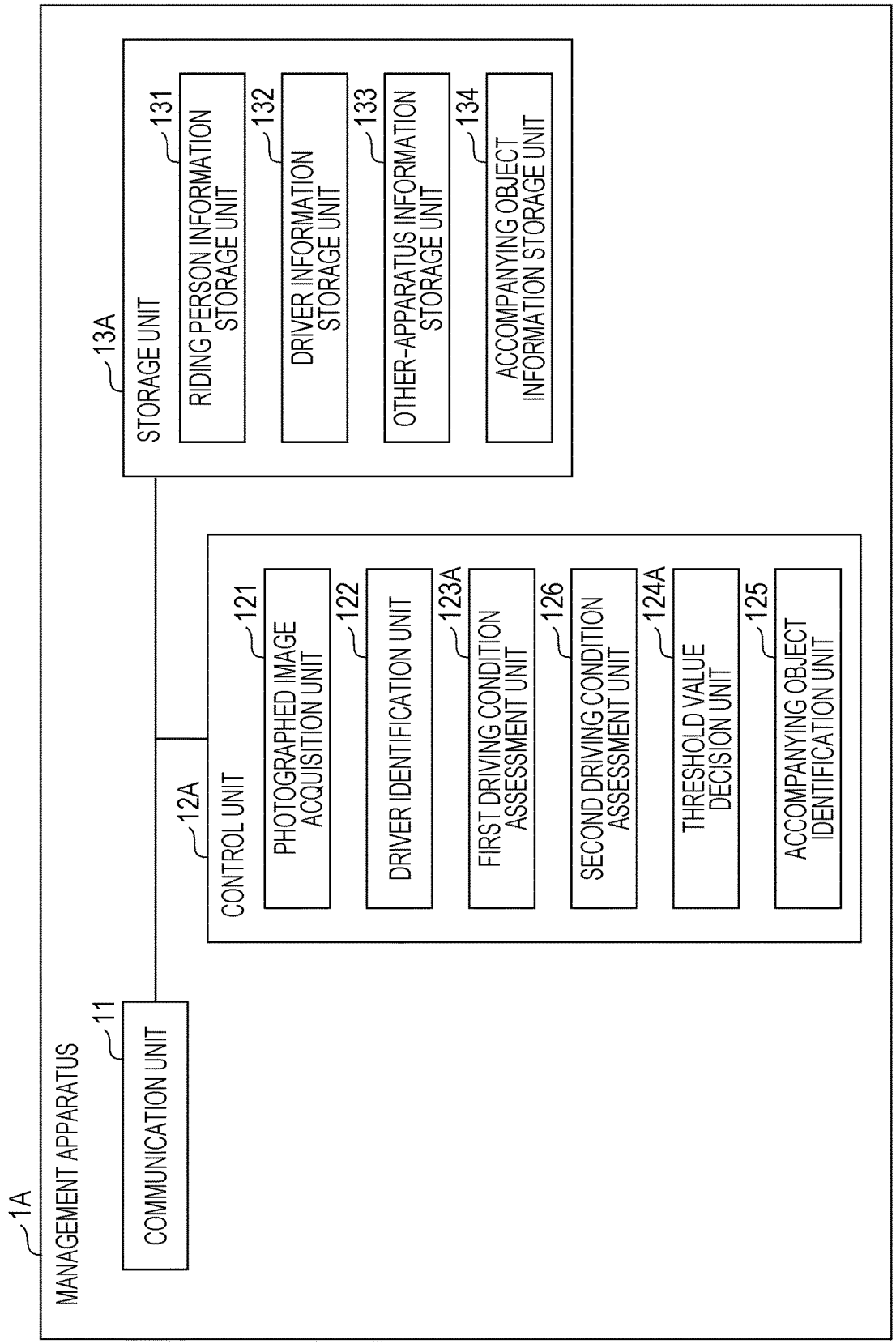
FIG. 9 is a block diagram that illustrates a configuration of a management apparatus in a second embodiment.

FIG. 9 is a block diagram that illustrates a configuration of a management apparatus in the second embodiment. Note that the configuration of the photographing apparatus in the second embodiment is the same as the configuration of the photographing apparatus in the first embodiment.

A management apparatus 1A includes the communication unit 11, a control unit 12A, and a storage unit 13A. Note that in the second embodiment, the same reference numerals will be given to the same configurations as the first embodiment, and a description will not be made.

The control unit 12A includes the photographed image acquisition unit 121, the driver identification unit 122, a first driving condition assessment unit 123A, a threshold value decision unit 124A, an accompanying object identification unit 125, and a second driving condition assessment unit 126.

The storage unit 13A includes the riding person information storage unit 131, the driver information storage unit 132, the other-apparatus information storage unit 133, and an accompanying object information storage unit 134.

In addition to the configuration of the first embodiment, the management apparatus 1A includes the first driving condition assessment unit 123A, the accompanying object identification unit 125, the second driving condition assessment unit 126, and the accompanying object information storage unit 134. Note that the first driving condition assessment unit 123A has the same configuration as the driving condition assessment unit 123 in the first embodiment.

The accompanying object identification unit 125 identifies the object that accompanies the driver in the vehicle 4 from the first photographed image. The accompanying object identification unit 125 extracts the face image that is associated with the vehicle identification information included in the first photographed image from the riding person information storage unit 131, picks out the face image of the object that is present in a portion other than the driver seat in the first photographed image, compares this face image with the extracted face image, and identifies the riding person identification information, which is associated with the matching face image, as the accompanying object. Accordingly, the riding person identification information of the accompanying object may be specified. Note that the accompanying object is not limited to a human but may be an animal such as a dog or a cat.

The accompanying object information storage unit 134 stores in advance accompanying object information in which the riding person identification information is associated with attribute information of the accompanying object and is identified by the riding person identification information. The attribute information includes type information that indicates which of an adult, a child, or an animal the accompanying object, which corresponds to the riding person identification information, is. That is, the accompanying object information associates the riding person identification information with the attribute information that indicates any of an adult, a child, or an animal. Note that a child is a person who is 12 years old or younger, for example.

The second driving condition assessment unit 126 acquires the accompanying object information that indicates at least one of an attribute and a status of the identified object and uses the accompanying object information to perform a second assessment about whether or not the identified object is an object that attracts attention of the driver. The attribute of the object includes the type of the object. The object that attracts attention of the driver includes a child and an animal. The second driving condition assessment unit 126 assesses whether or not the type of the identified object is either one of a child or an animal. In a case where the second driving condition assessment unit 126 assesses that the type of the identified object is either one of a child or an animal, the second driving condition assessment unit 126 assesses that the identified object is the object that attracts attention of the driver. Further, in a case where the identified object is an adult, the second driving condition assessment unit 126 assesses that the identified object is not the object that attracts attention of the driver. Note that an object recognition technique may be used for distinction of the attribute of the object. For example, the accompanying object identification unit 125 may identify even the attribute of the accompanying object, and the second driving condition assessment unit 126 may assess whether the attribute of the identified object is a predetermined attribute (for example, an adult, a child, and so forth, which are described above).

In a case where the identified object is assessed as the object that attracts attention of the driver in the second assessment by the second driving condition assessment unit 126, the threshold value decision unit 124A changes the decided threshold value. In a case where the type of the identified object is assessed as either one of a child or an animal, the threshold value decision unit 124A changes the threshold value to a value by which occurrence of the event is less likely detected than the decided threshold value. The threshold value decision unit 124A further raises the decided threshold value in a case where the accompanying object is the object, to which attention obviously has to be paid, such as a child or an animal, for example.

Figure 10:
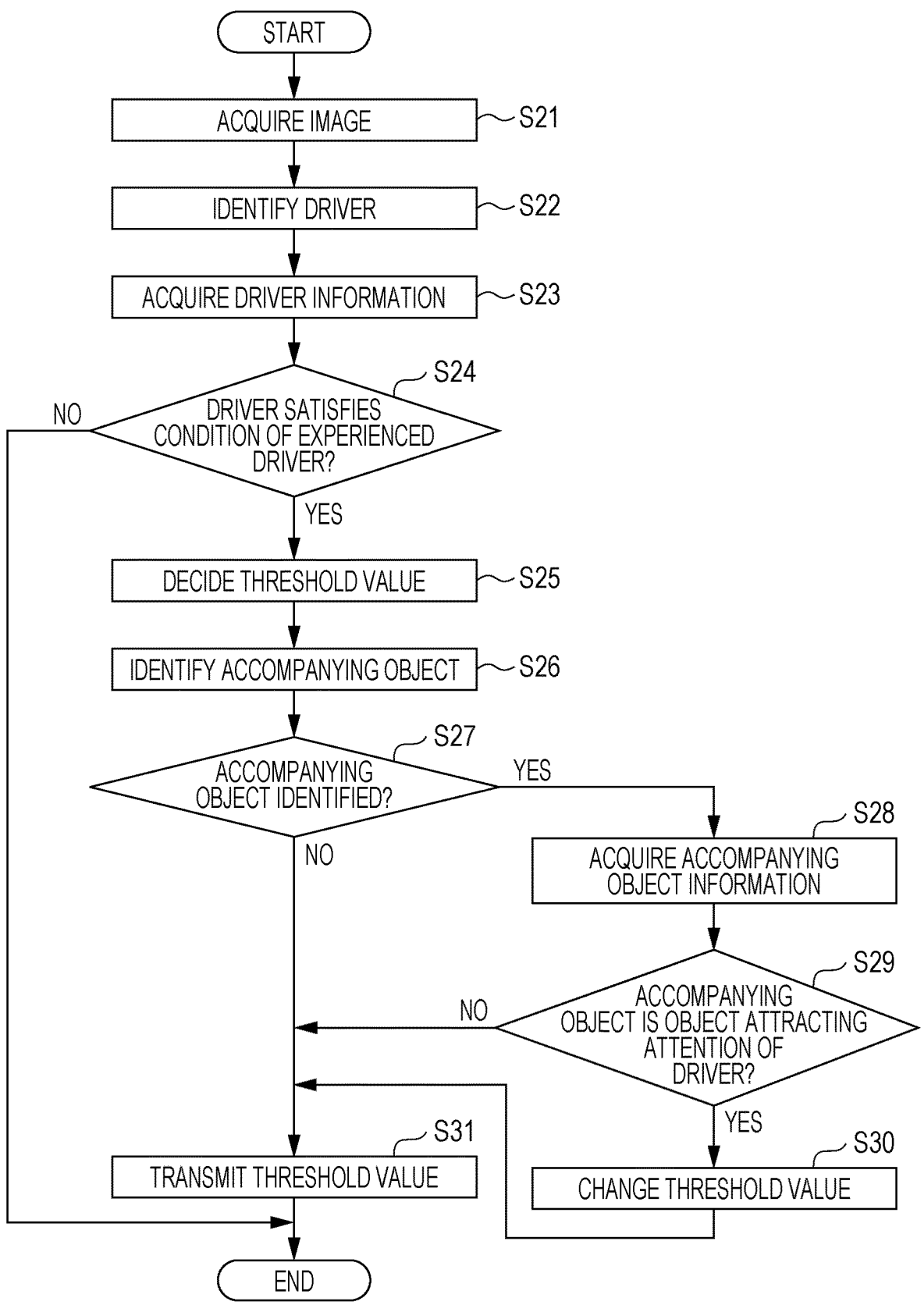
FIG. 10 is a flowchart that illustrates a process of the management apparatus in the second embodiment.

FIG. 10 is a flowchart that illustrates a process of the management apparatus in the second embodiment.

Processes of steps S21 to S25 are the same as the processes of steps S11 to S15 illustrated in FIG. 5, and a description will thus not be made.

Next, the accompanying object identification unit 125 identifies the object that accompanies the driver in the vehicle 4 from the first photographed image (step S26). The accompanying object identification unit 125 uses the image recognition technique to identify which of the riding person and an animal that are registered in advance the object that accompanies the driver in the vehicle 4 is and to specify the riding person identification information of the accompanying object.

Note that in the second embodiment, the accompanying object is identified from the first photographed image. However, the present disclosure is not particularly limited to this, but the riding person information storage unit 131 may store in advance biological information such as fingerprints or an iris of the riding person as the riding person information, and the accompanying object identification unit 125 may acquire the biological information of the accompanying object, compare the biological information acquired from the accompanying object with the riding person information stored in the riding person information storage unit 131, and thereby identify the accompanying object.

Further, the riding person information storage unit 131 may store in advance the riding person identification information for identifying the riding person as the riding person information, and the photographing apparatus 2 may receive the riding person identification information that is transmitted from a terminal apparatus or an RF tag which is owned by the accompanying object and transmit the received riding person identification information to the management apparatus 1A. Then, the accompanying object identification unit 125 may compare the riding person identification information that is received from the photographing apparatus 2 with the riding person information that is stored in the riding person information storage unit 131 and thereby identify the accompanying object.

Next, the second driving condition assessment unit 126 assesses whether or not the accompanying object is identified by the accompanying object identification unit 125 (step S27). Here, in a case where the accompanying object is assessed as not identified (NO in step S27), the communication unit 11 transmits the threshold value that is decided by the threshold value decision unit 124A to the photographing apparatus 2 (step S31).

On the other hand, in a case where the accompanying object is assessed as identified (YES in step S27), the second driving condition assessment unit 126 acquires the accompanying object information that corresponds to the riding person identification information of the accompanying object which is identified by the accompanying object identification unit 125 from the accompanying object information storage unit 134 (step S28).

Next, the second driving condition assessment unit 126 uses the acquired accompanying object information to assess whether or not the identified accompanying object is the object that attracts attention of the driver (step S29). Specifically, the second driving condition assessment unit 126 refers to the accompanying object information and assesses whether or not the attribute information associated with the riding person identification information of the accompanying object which is identified by the accompanying object identification unit 125 is a child or an animal.

Figure 11:
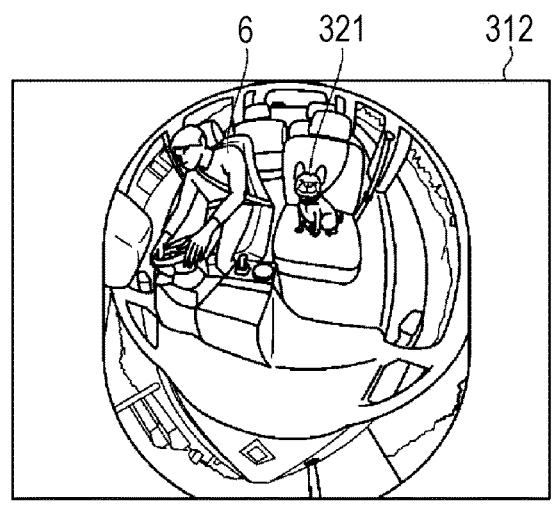
FIG. 11 is a diagram that illustrates one example of the first photographed image that is photographed in a case where an animal accompanies a driver in a vehicle in the second embodiment.
Figure 12:
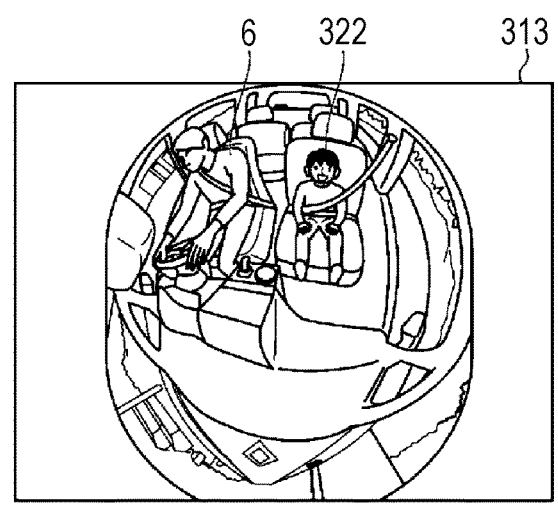
FIG. 12 is a diagram that illustrates one example of the first photographed image that is photographed in a case where an infant accompanies the driver in the vehicle in the second embodiment.
Figure 13:
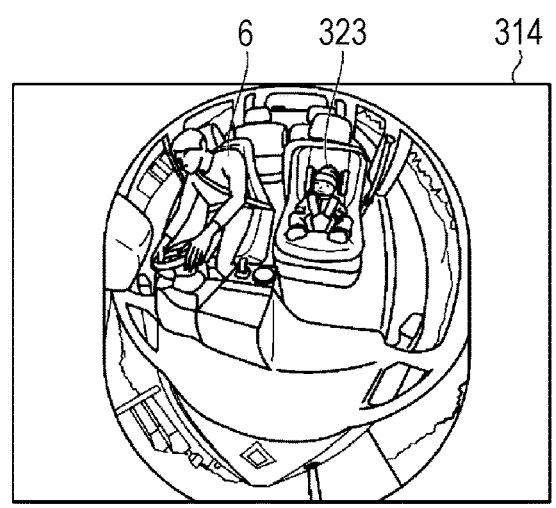
FIG. 13 is a diagram that illustrates one example of the first photographed image that is photographed in a case where a baby accompanies the driver in the vehicle in the second embodiment.

FIG. 11 is a diagram that illustrates one example of the first photographed image that is photographed in a case where an animal accompanies the driver in the vehicle in the second embodiment. FIG. 12 is a diagram that illustrates one example of the first photographed image that is photographed in a case where an infant accompanies the driver in the vehicle in the second embodiment. FIG. 13 is a diagram that illustrates one example of the first photographed image that is photographed in a case where a baby accompanies the driver in the vehicle in the second embodiment.

A first photographed image 312 illustrated in FIG. 11 includes a dog 321 as the object that accompanies the driver 6 in the vehicle. In this case, the accompanying object identification unit 125 uses the image recognition technique to specify the riding person identification information of the dog 321 that accompanies the driver 6 in the vehicle. Then, the second driving condition assessment unit 126 refers to the accompanying object information and assesses that the attribute information associated with the riding person identification information of the accompanying dog 321 which is identified by the accompanying object identification unit 125 is an animal.

Further, a first photographed image 313 illustrated in FIG. 12 includes an infant 322 as the object that accompanies the driver 6 in the vehicle. In this case, the accompanying object identification unit 125 uses the image recognition technique to specify the riding person identification information of the infant 322 who accompanies the driver 6 in the vehicle. Then, the second driving condition assessment unit 126 refers to the accompanying object information and assesses that the attribute information associated with the riding person identification information of the accompanying infant 322 who is identified by the accompanying object identification unit 125 is a child.

In addition, a first photographed image 314 illustrated in FIG. 13 includes a baby 323 as the object that accompanies the driver 6 in the vehicle. In this case, the accompanying object identification unit 125 uses the image recognition technique to specify the riding person identification information of the baby 323 who accompanies the driver 6 in the vehicle. Then, the second driving condition assessment unit 126 refers to the accompanying object information and assesses that the attribute information associated with the riding person identification information of the accompanying baby 323 who is identified by the accompanying object identification unit 125 is a child.

Returning to FIG. 10, in a case where the accompanying object is assessed as the object that attracts attention of the driver, that is, a case where the accompanying object is assessed as a child or an animal (YES in step S29), the threshold value decision unit 124A changes the decided threshold value (step S30). Specifically, in a case where the accompanying object is assessed as the object that attracts attention of the driver, the threshold value decision unit 124A raises the decided threshold value. Then, in step S31, the communication unit 11 transmits the threshold value that is changed by the threshold value decision unit 124A to the photographing apparatus 2.

On the other hand, in a case where the accompanying object is assessed as not the object that attracts attention of the driver, that is, a case where the accompanying object is assessed as an adult (NO in step S29), the process moves to a process of step S31 without changing the threshold value that is decided by the threshold value decision unit 124A.

Note that in the second embodiment, the second driving condition assessment unit 126 assesses whether or not the accompanying object is the object that attracts attention of the driver based on the attribute of the accompanying object but may assess whether or not the accompanying object is the object that attracts attention of the driver based on the status of the accompanying object. The status of the object includes a state of the object, presence or absence of an action, or contents of an action. The second driving condition assessment unit 126 may assesses whether or not the state of the identified object is a predetermined state, whether or not the identified object is moving, or whether or not the action of the identified object is a predetermined action. In a case where the state of the object is assessed as the predetermined state, a case where the object is assessed as moving, or a case where the action of the object is assessed as the predetermined action, the threshold value decision unit 124A may change the threshold value to a value by which occurrence of the event is less likely detected than the decided threshold value.

For example, in a case where the accompanying object is a child, the second driving condition assessment unit 126 may assess whether or not the accompanying object is the object that attracts attention of the driver based on whether or not the child is awake. In a case where the accompanying child is assessed as awake, the second driving condition assessment unit 126 may assess that the accompanying object is the object that attracts attention of the driver. In a case where the accompanying child is assessed as not awake, that is, a case where the accompanying child is assessed as sleeping, the second driving condition assessment unit 126 may assess that the accompanying object is not the object that attracts attention of the driver. Note that whether or not the child is awake may be assessed from the first photographed image by the image recognition technique.

Third Embodiment

In the first embodiment, whether or not the driver satisfies the condition of experienced driver is assessed, and in a case where the driver is assessed as satisfying the condition of experienced driver, the threshold value is decided. However, in a third embodiment, whether or not a driving situation of the driver is a predetermined situation is further assessed, and in a case where the driving situation of the driver is assessed as the predetermined situation, the decided threshold value is changed.

Figure 14:
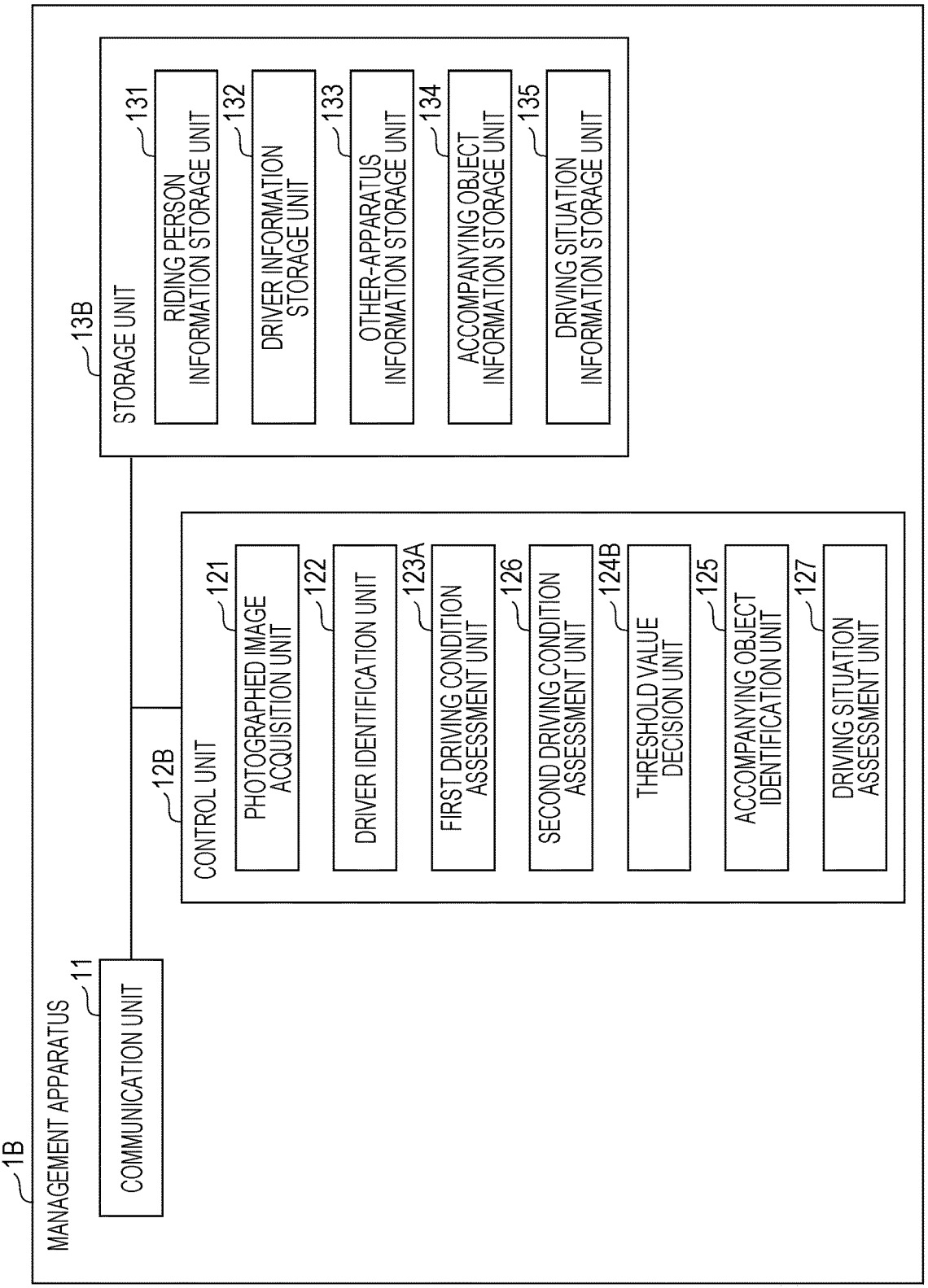
FIG. 14 is a block diagram that illustrates a configuration of a management apparatus in a third embodiment.

FIG. 14 is a block diagram that illustrates a configuration of a management apparatus in the third embodiment.

A management apparatus 1B includes the communication unit 11, a control unit 12B, and a storage unit 13B. Note that in the third embodiment, the same reference characters will be given to the same configurations as the first embodiment and the second embodiment, and a description will not be made.

The control unit 12B includes the photographed image acquisition unit 121, the driver identification unit 122, the first driving condition assessment unit 123A, a threshold value decision unit 124B, the accompanying object identification unit 125, the second driving condition assessment unit 126, and a driving situation assessment unit 127.

The storage unit 13B includes the riding person information storage unit 131, the driver information storage unit 132, the other-apparatus information storage unit 133, the accompanying object information storage unit 134, and a driving situation information storage unit 135.

In addition to the configuration of the first embodiment and the configuration of the second embodiment, the management apparatus 1B includes the driving situation assessment unit 127 and the driving situation information storage unit 135.

The driving situation information storage unit 135 stores driving situation information that indicates the driving situation of the driver. The driving situation information includes a driving time from a start of driving of the vehicle to the present time. The driving situation information storage unit 135 stores the driving situation information in which the riding person identification information is associated with the driving time from the time when the driver identified by the riding person identification information starts driving the vehicle to the present time. Note that the time when the driving of the vehicle is started is a time when the engine of the vehicle is started, for example. Further, the driving situation information storage unit 135 may store the driving situation information in which the riding person identification information is associated with the time when the driver identified by the riding person identification information starts driving the vehicle.

The driving situation assessment unit 127 acquires the driving situation information that indicates the driving situation of the driver and uses the driving situation information to perform a third assessment about whether or not the driving situation of the identified driver is the predetermined situation. The driving situation assessment unit 127 assesses whether or not a continuous driving time of the vehicle reaches a predetermined time. For example, the driving situation assessment unit 127 assesses whether or not the driving time of the identified driver reaches the predetermined time. In a case where the driving situation assessment unit 127 assesses that the driving time of the identified driver reaches the predetermined time, the driving situation assessment unit 127 assesses that the driving situation of the identified driver is the predetermined situation.

In a case where the driving situation of the identified driver is assessed as the predetermined situation in the third assessment, the threshold value decision unit 124B changes the decided threshold value. In a case where the continuous driving time is assessed as reaching the predetermined time, the threshold value decision unit 124B changes the decided threshold value.

Note that in the third embodiment, the driving situation information may include a continuous driving distance of the vehicle, for example, a driving distance from a start of driving of the vehicle to the present time. In this case, the driving situation assessment unit 127 may assess whether or not the continuous driving distance reaches a predetermined distance. For example, the driving situation assessment unit 127 may assess whether or not the driving distance of the identified driver reaches the predetermined distance. In a case where the driving situation assessment unit 127 assesses that the driving distance of the identified driver reaches the predetermined distance, the driving situation assessment unit 127 may assess that the driving situation of the identified driver is the predetermined situation. In a case where the continuous driving distance is assessed as reaching the predetermined distance, the threshold value decision unit 124B may change the decided threshold value.

Further, in the third embodiment, the driving situation information may include an event occurrence number of times in which the events occur during the driving of the vehicle, for example, the event occurrence number of times in which the events occur from the time when the driving of the vehicle is started to the present time. In this case, the driving situation assessment unit 127 may assess whether or not the event occurrence number of times during the driving reaches a predetermined number of times. For example, the driving situation assessment unit 127 may assess whether or not the event occurrence number of times of the identified driver reaches the predetermined number of times. In a case where the driving situation assessment unit 127 assesses that the event occurrence number of times of the identified driver reaches the predetermined number of times, the driving situation assessment unit 127 may assess that the driving situation of the identified driver is the predetermined situation. In a case where the event occurrence number of times during the driving is assessed as reaching the predetermined number of times, the threshold value decision unit 124B may change the decided threshold value.

Figure 15:
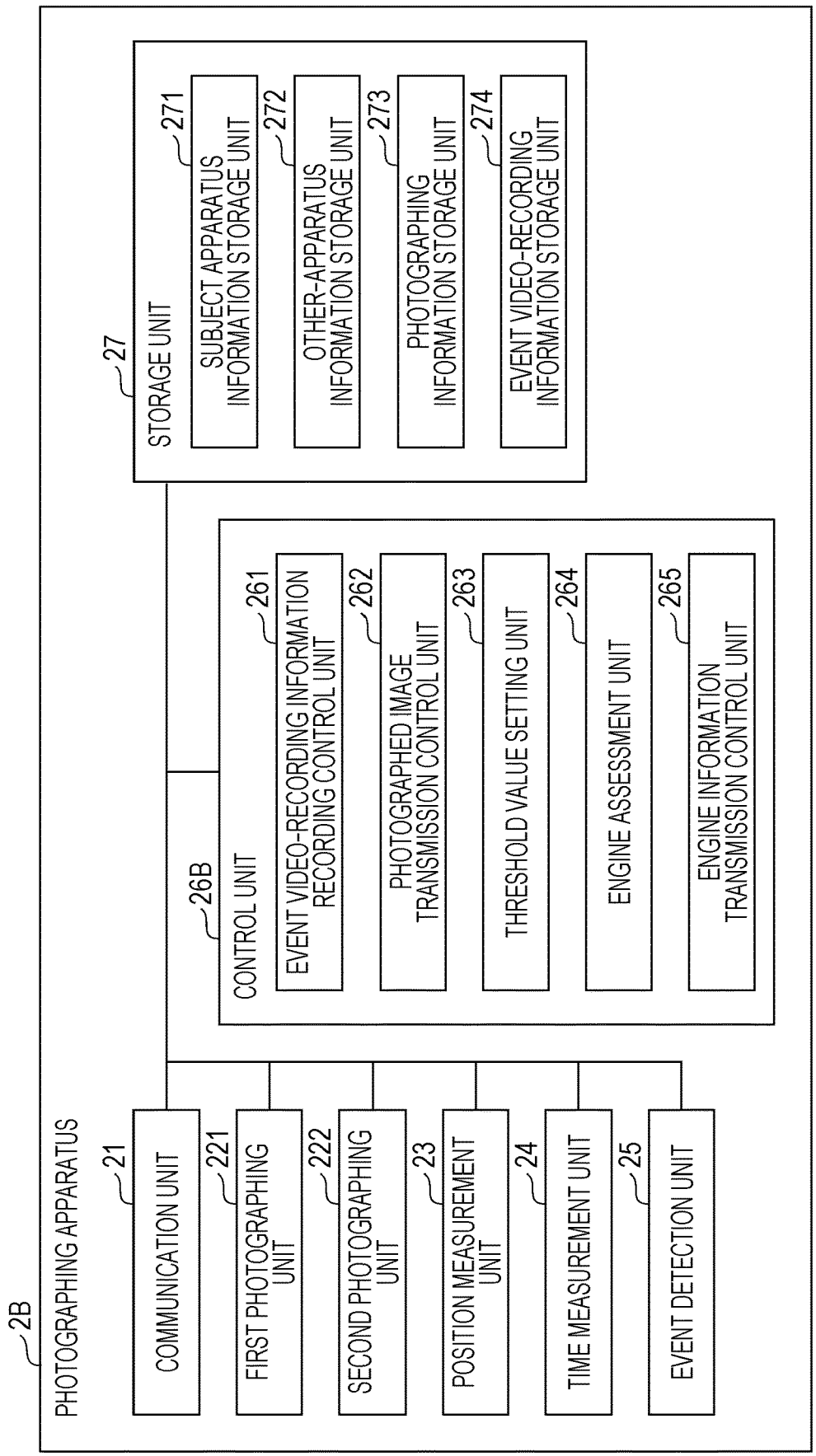
FIG. 15 is a block diagram that illustrates a configuration of a photographing apparatus in the third embodiment.

FIG. 15 is a block diagram that illustrates a configuration of a photographing apparatus in the third embodiment.

The photographing apparatus 2B includes the communication unit 21, the first photographing unit 221, the second photographing unit 222, the position measurement unit 23, the time measurement unit 24, the event detection unit 25, a control unit 26B, and the storage unit 27. Note that in the third embodiment, the same reference characters will be given to the same configurations as the first embodiment and the second embodiment, and a description will not be made.

The control unit 26B includes the event video-recording information recording control unit 261, the photographed image transmission control unit 262, the threshold value setting unit 263, an engine assessment unit 264, and an engine information transmission control unit 265.

The engine assessment unit 264 assesses whether or not the engine of the vehicle in which the photographing apparatus 2B is arranged is started and assesses whether or not the engine of the vehicle is stopped.

In a case where the engine assessment unit 264 assesses that the engine of the vehicle is started, the engine information transmission control unit 265 transmits an engine start signal that indicates that the engine of the vehicle is started to the management apparatus 1B. Further, in a case where the engine assessment unit 264 assesses that the engine of the vehicle is stopped, the engine information transmission control unit 265 transmits an engine stop signal that indicates that the engine of the vehicle is stopped to the management apparatus 1B.

The communication unit 11 of the management apparatus 1B receives the engine start signal or the engine stop signal. The control unit 12B measures a time from the time when the engine start signal is received and stores the measured time as the driving time in the driving situation information storage unit 135. Further, in a case where the control unit 12B receives the engine stop signal, the control unit 12B finishes storage of the driving time into the driving situation information storage unit 135.

Figure 16:
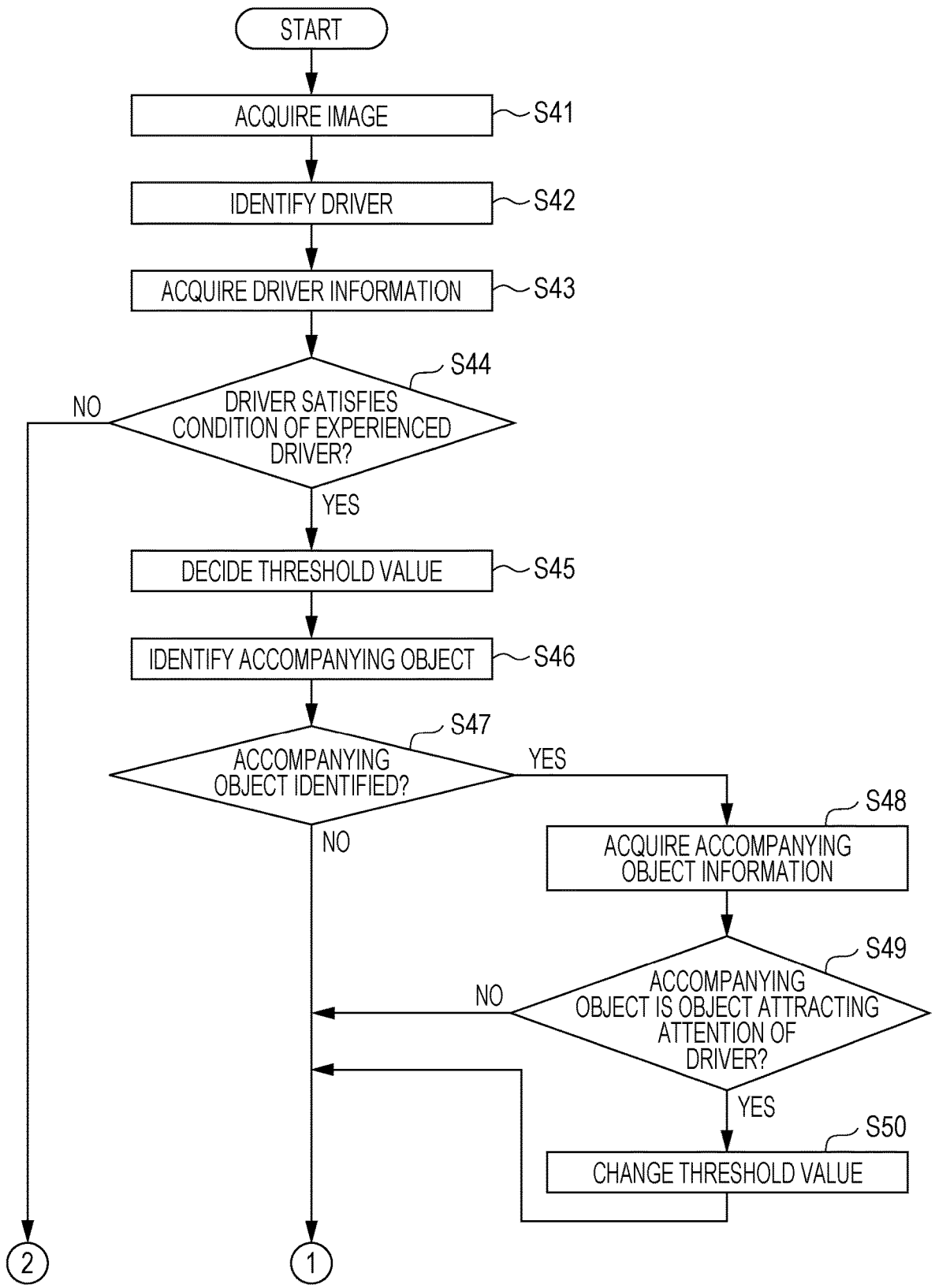
FIG. 16 is a first flowchart that illustrates a process of the management apparatus in the third embodiment.
Figure 17:
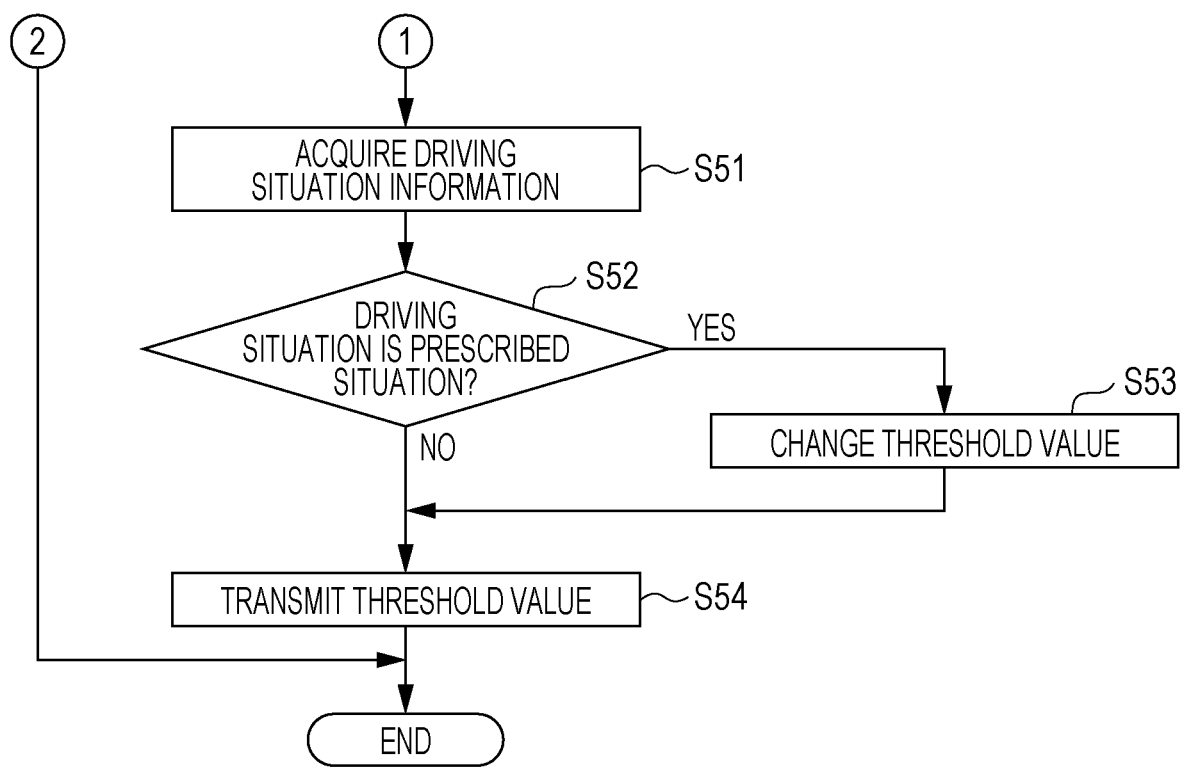
FIG. 17 is a second flowchart that illustrates the process of the management apparatus in the third embodiment.

FIG. 16 is a first flowchart that illustrates a process of the management apparatus in the third embodiment. FIG. 17 is a second flowchart that illustrates the process of the management apparatus in the third embodiment.

Processes of steps S41 to S50 are the same as the processes of steps S21 to S30 illustrated in FIG. 10, and a description will thus not be made.

Next, in a case where the accompanying object is assessed as not identified (NO in step S47), a case where the accompanying object is assessed as not the object that attracts attention of the driver (NO in step S49), or a case where the decided threshold value is changed (step S50), the driving situation assessment unit 127 acquires the driving situation information, which is associated with the riding person identification information of the identified driver, from the driving situation information storage unit 135 (step S51).

Next, the driving situation assessment unit 127 uses the acquired driving situation information to assess whether or not the driving situation of the identified driver is the predetermined situation (step S52). The driving situation assessment unit 127 assesses whether or not the driving time of the identified driver reaches the predetermined time. Specifically, the driving situation assessment unit 127 assesses whether or not the driving time of the identified driver reaches the predetermined time. In a case where the driving situation assessment unit 127 assesses that the driving time of the identified driver reaches the predetermined time, the driving situation assessment unit 127 assesses that the driving situation of the identified driver is the predetermined situation. In a case where the driving situation assessment unit 127 assesses that the driving time of the identified driver does not reach the predetermined time, the driving situation assessment unit 127 assesses that the driving situation of the identified driver is not the predetermined situation. Note that the predetermined time is a time in which the driver feels fatigue due to long time driving, for example, five hours.

Here, in a case where the driving situation is assessed as the predetermined situation, that is, a case where the driving time of the identified driver is assessed as reaching the predetermined time (YES in step S52), the threshold value decision unit 124B changes the decided threshold value (step S53). Specifically, in a case where the driving situation is assessed as the predetermined situation, the threshold value decision unit 124B raises the decided threshold value.

Note that the predetermined time to be compared with the driving time may be changed in accordance with the age of the driver. For example, the predetermined time in a case where the driver is in his/her fifties may be made shorter than the predetermined time in a case where the driver is in his/her twenties. The predetermined time may be made shorter as the age of the driver becomes higher.

Further, the raising width of the threshold value may be changed in accordance with the age of the driver. For example, the raising width of the threshold value in a case where the driver is in his/her fifties may be made larger than the raising width of the threshold value in a case where the driver is in his/her twenties. The raising width of the threshold value may be made larger as the age of the driver becomes higher.

Next, the communication unit 11 transmits the threshold value that is changed by the threshold value decision unit 124B to the photographing apparatus 2B (step S54).

On the other hand, in a case where the driving situation is assessed as not the predetermined situation, that is, a case where the driving time of the identified driver is assessed as not reaching the predetermined time (NO in step S52), the process moves to a process of step S54 without changing the threshold value that is decided by the threshold value decision unit 124B.

Note that in the third embodiment, in a case where the driving time of the identified driver reaches the predetermined time, that is, a case where the driver drives for a long time, the decided threshold value is raised. However, in a case where the driving time of the identified driver reaches the predetermined time and the driver thereafter rests for a predetermined time and again starts driving, the raised threshold value may be lowered. Whether or not the driver rests for the predetermined time may be assessed by measuring the time after the engine is stopped.

In this case, the driving situation information storage unit 135 may store the driving situation information in which the riding person identification information, the driving time from the time when the driver identified by the riding person identification information starts driving the vehicle to the present time, and a rest time from the time when the driver identified by the riding person identification information stops driving the vehicle to the present time are associated together. Note that the time when the driving of the vehicle is stopped is a time when the engine of the vehicle is stopped, for example. The driving situation assessment unit 127 assesses whether or not the vehicle is driven for a predetermined time, is thereafter stopped for a predetermined time, and is started being driven again. In a case where it is assessed that the vehicle is driven for the predetermined time, is thereafter stopped for the predetermined time, and is started being driven again, the threshold value decision unit 124B lowers the raised threshold value.

In the third embodiment, the predetermined time may include a first time and a second time that is longer than the first time. The threshold value decision unit 124B may change the threshold value to different values between a case where the continuous driving time is assessed as reaching the first time and a case where the continuous driving time is assessed as reaching the second time.

Figure 18:
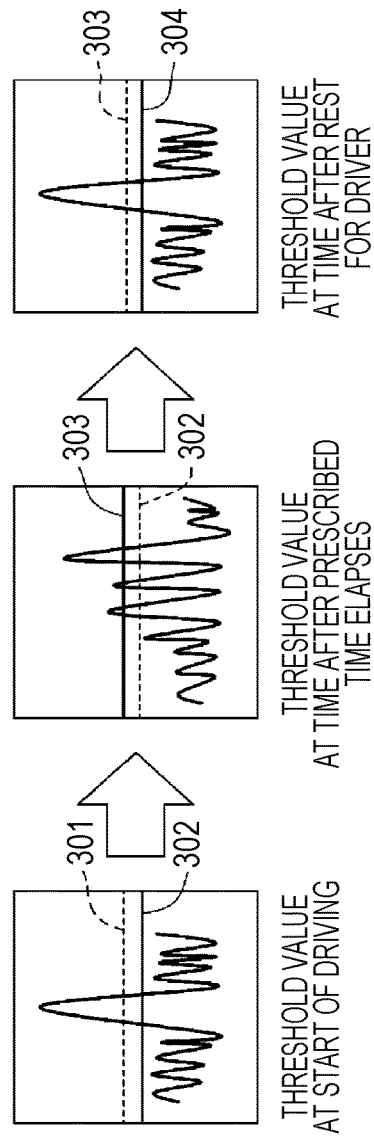
FIG. 18 is a schematic diagram for explaining the threshold value that is changed in a case where the driver who is an experienced driver drives for a predetermined time, thereafter rests for a predetermined time, and again starts driving, in the third embodiment.

FIG. 18 is a schematic diagram for explaining the threshold value that is changed in a case where the driver who is an experienced driver drives for the predetermined time, thereafter rests for the predetermined time, and again starts driving, in the third embodiment. The waveform illustrated in FIG. 18 represents the acceleration of the vehicle.

First, in a case where the identified driver is assessed as satisfying the condition of experienced driver at a start of driving, the threshold value decision unit 124B decides the threshold value as a first threshold value 302 that is lower than an initial threshold value 301. Next, in a case where the driving time of the identified driver is assessed as reaching the predetermined time, the threshold value decision unit 124B changes the threshold value to a second threshold value 303 that is higher than the first threshold value 302. Note that the second threshold value 303 may be the same as the initial threshold value 301 or may be different from the initial threshold value 301. As illustrated in FIG. 18, in a case where the driving is performed for a long time, the driver is fatigued, and the number of times of jamming on the brake may thereby increase. The acceleration possibly exceeds the first threshold value 302 even in a non-dangerous situation. Thus, the threshold value decision unit 124B changes the threshold value to the second threshold value 303 that is higher than the first threshold value 302, and only the second photographed image in which a dangerous situation is photographed may thereby be recorded.

Subsequently, the driving situation assessment unit 127 assesses whether or not the driving is again started after the vehicle stops for the predetermined time. In a case where it is assessed that the driving is again stated after the vehicle stops for the predetermined time, when the driving is again started, the threshold value decision unit 124B changes the threshold value to the third threshold value 304 that is lower than the second threshold value 303. Note that the third threshold value 304 may be the same as the first threshold value 302 or may be different from the first threshold value 302. In such a manner, in a case where the driving is again started after the driver rests, the threshold value is changed to the third threshold value 304 that is lower than the second threshold value 303, and the event that occurs in response to occurrence of a dangerous situation may thereby be detected more certainly.

Further, in the third embodiment, in a case where, at a start of driving, the driver does not satisfy the condition of experienced driver and the driver is a person who is not accustomed to driving the vehicle, the threshold value is decided as a threshold value that is higher than the initial threshold value. However, the present disclosure is not particularly limited to this. That is, even in a case where the driver is a person who is not accustomed to driving the vehicle, the driver become accustomed to driving by driving for a predetermined time. That is, the threshold value decision unit 124B may lower the decided threshold value in a case where the driver drives for the predetermined time and may raise the lowered threshold value in a case where the driver further drives for a predetermined time. Furthermore, in a case where the driver rests for the predetermined time and again starts driving, the threshold value decision unit 124B may lower the raised threshold value.

In this case, the driving situation information storage unit 135 may store the driving situation information in which the riding person identification information, the driving time from the time when the driver identified by the riding person identification information starts driving the vehicle to the present time, and the rest time from the time when the driver identified by the riding person identification information stops driving the vehicle to the present time are associated together.

Figure 19:
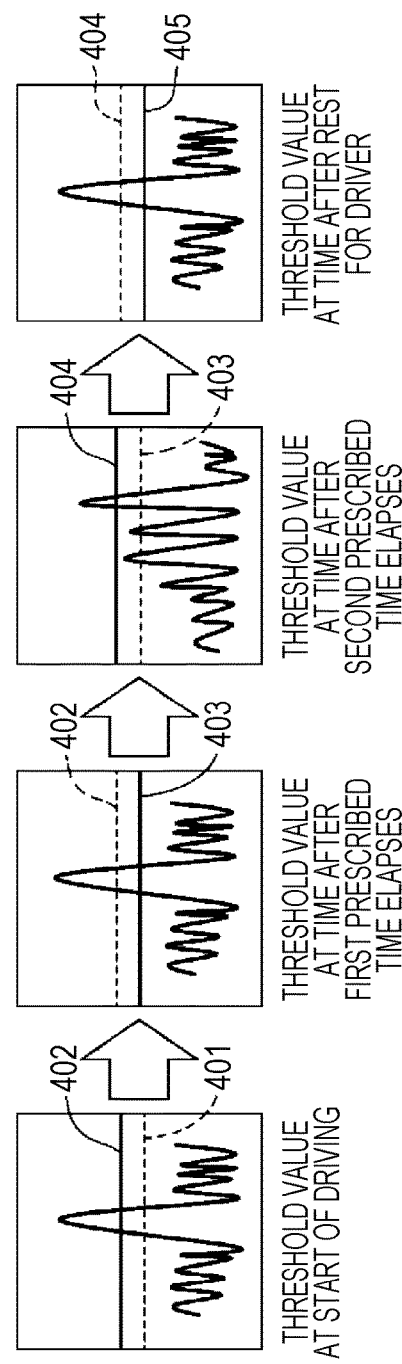
FIG. 19 is a schematic diagram for explaining the threshold value that is changed in a case where the driver who is a beginner drives for a predetermined time, thereafter rests for a predetermined time, and again starts driving, in the third embodiment.

FIG. 19 is a schematic diagram for explaining the threshold value that is changed in a case where the driver who is a beginner drives for a predetermined time, thereafter rests for a predetermined time, and again starts driving, in the third embodiment. The waveform illustrated in FIG. 19 represents the acceleration of the vehicle.

First, in a case where the identified driver is assessed as not satisfying the condition of experienced driver at a start of driving, the threshold value decision unit 124B decides the threshold value as a first threshold value 402 that is higher than an initial threshold value 401. Next, the driving situation assessment unit 127 assesses whether or not the driving time of the identified driver reaches a first predetermined time. In a case where the driving time of the identified driver is assessed as reaching the first predetermined time, the threshold value decision unit 124B changes the threshold value to a second threshold value 403 that is lower than the first threshold value 402. Note that the second threshold value 403 may be the same as the initial threshold value 401 or may be different from the initial threshold value 401. Further, the first predetermined time is a time in which the driver becomes accustomed to driving, for example, two hours. In such a manner, in a case where the driver becomes accustomed to driving the vehicle, the threshold value is changed to the second threshold value 403 that is lower than the first threshold value 402, and the event that occurs in response to occurrence of a dangerous situation may thereby be detected more certainly.

Next, the driving situation assessment unit 127 assesses whether or not the driving time of the identified driver reaches a second predetermined time. In a case where the driving time of the identified driver is assessed as reaching the second predetermined time, the threshold value decision unit 124B changes the threshold value to a third threshold value 404 that is higher than the second threshold value 403. Note that the third threshold value 404 may be the same as the first threshold value 402 or may be different from the first threshold value 402. Further, the second predetermined time is a time in which the driver feels fatigue due to long time driving, for example, five hours. As illustrated in FIG. 19, in a case where the driving is performed for a long time, the driver is fatigued, and the number of times of jamming on the brake may thereby increase. The acceleration possibly exceeds the second threshold value 403 even in a non-dangerous situation. Thus, the threshold value decision unit 124B changes the threshold value to the third threshold value 404 that is higher than the second threshold value 403, and only the second photographed image in which a dangerous situation is photographed may thereby be recorded.

Subsequently, the driving situation assessment unit 127 assesses whether or not the driving is again started after the vehicle stops for the predetermined time. In a case where it is assessed that the driving is again stated after the vehicle stops for the predetermined time, when the driving is again started, the threshold value decision unit 124B changes the threshold value to a fourth threshold value 405 that is lower than the third threshold value 404. Note that the fourth threshold value 405 may be the same as the second threshold value 403 or may be different from the second threshold value 403. In such a manner, in a case where the driving is again started after the driver rests, the threshold value is changed to the fourth threshold value 405 that is lower than the third threshold value 404, and the event that occurs in response to occurrence of a dangerous situation may thereby be detected more certainly.

Further, in the third embodiment, the predetermined distance may include a first distance and a second distance that is longer than the first distance. The threshold value decision unit 124B may change the threshold value to different values between a case where the continuous driving distance is assessed as reaching the first distance and a case where the continuous driving distance is assessed as reaching the second distance.

Further, in the third embodiment, the predetermined number of times may include a first number of times and a second number of times that is more than the first number of times. The threshold value decision unit 124B may change the threshold value to different values between a case where the event occurrence number of times during the driving is assessed as reaching the first number of times and a case where the event occurrence number of times during the driving is assessed as reaching the second number of times.

In the foregoing, a description has been made about the system of the present disclosure based on the embodiments. However, the present disclosure is not limited to the embodiments. Modes in which various kinds of modifications conceived by persons having ordinary skill in the art are applied to the embodiments and modes that are configured by combining configuration elements in different embodiments may be included in the scope of one or plural aspects of the present disclosure unless the modes depart from the gist of the present disclosure.

Note that in the above embodiments, the configuration elements may be realized by configuring those with dedicated hardware or by executing software programs that are suitable for the configuration elements. A program execution unit such as a processor reads out and executes software programs that are recorded in a recording medium such as a hard disk or a semiconductor memory, and the configuration elements may thereby be realized.

All or a portion of the functions of the apparatuses according to the embodiments of the present disclosure are typically realized as large scale integration (LSI) that is an integrated circuit. Those may be formed into individual chips or formed into one chip that includes a portion or all of those. Further, formation of the integrated circuit is not limited to LSI, but the integrated circuit may be realized as a dedicated circuit or a general purpose processor. A field programmable gate array (FPGA), which is programmable after manufacture of LSI, or a reconfigurable processor, in which connection and settings of circuit cells inside the LSI are reconfigurable, may be used.

Further, all or a portion of the functions of the apparatuses according to the embodiments of the present disclosure may be realized by execution of a program by a processor such as a central processing unit (CPU).

Further, all the numerals used in the above are exemplified for specifically describing the present disclosure, and the present disclosure is not restricted by the exemplified numerals.

Further, the orders of execution of steps indicated in the above flowcharts are for exemplification for specifically describing the present disclosure and may be orders other than the above in the range in which similar effects may be obtained. Further, a portion of the above steps may simultaneously (in parallel) be executed with the other steps.

In addition, various kinds of modification examples in which changes within the range conceived by persons having ordinary skill in the art are applied to the embodiments of the present disclosure are included in the present disclosure unless those depart from the gist of the present disclosure.

An information processing method, an information processing apparatus, and a recording medium storing an information processing program according to the present disclosure are useful as an information processing method, an information processing apparatus, and a recording medium storing an information processing program, which may inhibit recording of a photographed image in which a situation other than an abnormal situation which occurs to a vehicle is photographed and record only photographed images in which an abnormal situation is photographed among photographed images in which an outside portion of a vehicle is photographed.

What is claimed is:

1. A computer implemented information processing method, comprising:
   acquiring a first photographed image that represents an inside portion of a vehicle;
   identifying a driver who drives the vehicle using the first photographed image;
   acquiring driver information that indicates at least one of an attribute of the identified driver and a driving history of the identified driver;
   first determining, using the driver information, whether or not the identified driver satisfies a condition of an experienced driver;
   deciding a threshold value that is used for detection of an occurrence of an event to be a trigger of photographing or recording of a second photographed image, which represents an outside portion of the vehicle based on a result of the first determining; and
   recording the second photographed image that is determined to be photographed or recorded using the threshold value,
   wherein the second photographed image is acquired from a photographing apparatus that photographs the outside portion of the vehicle.

2. The information processing method according to claim 1, further comprising:
   transmitting the threshold value to a recording apparatus that photographs the outside portion of the vehicle and records the second photographed image, which is generated by photographing using the threshold value.

3. The information processing method according to claim 1, further comprising:
   acquiring the second photographed image and sensing information from a photographing apparatus that photographs the outside portion of the vehicle and generates the second photographed image; and
   assessing whether or not the acquired second photographed image is recorded by using the threshold value and the sensing information.

4. The information processing method according to claim 1,
   wherein the first determining includes determining whether or not the identified driver is an owner of the vehicle.

5. The information processing method according to claim 4,
   wherein in a case where the identified driver is assessed as the owner of the vehicle, the threshold value, by which occurrence of the event is more likely detected than a reference threshold value, is decided.

6. The information processing method according to claim 4,
   wherein in a case where the identified driver is assessed as not the owner of the vehicle, the threshold value, by which occurrence of the event is less likely detected than a reference threshold value, is decided.

7. The information processing method according to claim 1,
   wherein the first determining includes determining whether or not a cumulative driving number of times of the vehicle of the identified driver is a predetermined time or more, or whether or not a cumulative driving distance of the vehicle of the identified driver is a predetermined distance or more.

8. The information processing method according to claim 7,
   wherein in a case where the cumulative driving number of times is determined as the predetermined time or more, or the cumulative driving distance is determined as the predetermined distance or more, the threshold value, by which occurrence of the event is more likely detected than a reference threshold value, is decided.

9. The information processing method according to claim 7,
   wherein in a case where the cumulative driving number of times is determined as not the predetermined time or more, or the cumulative driving distance is determined as not the predetermined distance or more, the threshold value, by which occurrence of the event is less likely detected than a reference threshold value, is decided.

10. The information processing method according to claim 1,
    wherein the first determining includes determining whether or not a cumulative driving number of times of the vehicle of the identified driver is a predetermined number of times or more.

11. The information processing method according to claim 10,
    wherein in a case where the cumulative driving number of times is determined as the predetermined number of times or more, the threshold value, by which occurrence of the event is more likely detected than a reference threshold value, is decided.

12. The information processing method according to claim 10,
    wherein in a case where the cumulative driving number of times is determined as less than the predetermined number of times, the threshold value, by which occurrence of the event is less likely detected than a reference threshold value, is decided.

13. The information processing method according to claim 1, further comprising:
    identifying an object that accompanies the driver in the vehicle from the first photographed image;
    acquiring object information that indicates at least one of an attribute and a status of the identified object;
    second determining, using the object information, whether or not the identified object is an object that attracts attention of the driver; and
    changing the decided threshold value in a case where the identified object is determined as the object that attracts attention of the driver in the second determining.

14. The information processing method according to claim 13,
    wherein the attribute of the object includes a type of the object,
    the second determining includes determining whether or not the type of the identified object is either one of a child or an animal, and
    in a case where the type of the identified object is determined as either one of a child or an animal, the threshold value is changed to a value by which occurrence of the event is less likely detected than the decided threshold value.

15. The information processing method according to claim 13,
wherein the status of the object includes a state of the object, presence or absence of an action, or a content of an action,
the second determining includes determining whether the state of the identified object is a predetermined state, determining whether the identified object is moving, or determining whether the action of the identified object is a predetermined action, and
in a case where the state of the object is determined as the predetermined state, a case where the object is determined as moving, or a case where the action of the object is determined as the predetermined action, the threshold value is changed to a value by which occurrence of the event is less likely detected than the decided threshold value.

16. The information processing method according to claim 1, further comprising:
acquiring driving situation information that indicates a driving situation of the driver;
third determining, using the driving situation information, whether or not the driving situation of the identified driver is a predetermined situation; and
changing the decided threshold value in a case where the driving situation of the identified driver is determined as the predetermined situation in the third determining.

17. The information processing method according to claim 16,
wherein the driving situation information includes at least one of a continuous driving time of the vehicle, a continuous driving distance of the vehicle, and an event occurrence number of times in which the events occur during driving of the vehicle,
the third determining includes determining at least one of whether or not the continuous driving time reaches a predetermined time, whether or not the continuous driving distance reaches a predetermined distance, and whether or not the event occurrence number of times during the driving reaches a predetermined number of times, and
the changing of the threshold value includes changing the decided threshold value in a case where the continuous driving time is determined as reaching the predetermined time, a case where the continuous driving distance is determined as reaching the predetermined distance, or a case where the event occurrence number of times during the driving is determined as reaching the predetermined number of times.

18. The information processing method according to claim 17,
wherein the predetermined time includes a first time and a second time that is longer than the first time,
the predetermined distance includes a first distance and a second distance that is longer than the first distance,
the predetermined number of times includes a first number of times and a second number of times that is more than the first number of times, and
the changing of the threshold value includes
changing the threshold value to different values between a case where the continuous driving time is determined as reaching the first time and a case where the continuous driving time is determined as reaching the second time,
changing the threshold value to different values between a case where the continuous driving distance is determined as reaching the first distance and a case where the continuous driving distance is determined as reaching the second distance, and
changing the threshold value to different values between a case where the event occurrence number of times during the driving is determined as reaching the first number of times and a case where the event occurrence number of times during the driving is determined as reaching the second number of times.

19. An information processing apparatus, comprising:
a processor; and
a non-transitory recording medium storing thereon a computer program, which when executed by the processor, causes the processor to perform operations including:
acquiring a first photographed image that represents an inside portion of a vehicle;
identifying a driver who drives the vehicle using the first photographed image;
acquiring driver information that indicates at least one of an attribute of the identified driver and a driving history of the identified driver;
determining, using the driver information, whether or not the identified driver satisfies a condition of an experienced driver;
deciding a threshold value that is used for detection of an occurrence of an event to be a trigger of photographing or recording of a second photographed image, which represents an outside portion of the vehicle based on a result of the determining; and
recording the second photographed image that is determined to be photographed or recorded using the threshold value,
wherein the second photographed image is acquired from a photographing apparatus that photographs the outside portion of the vehicle.

20. A non-transitory recording medium storing thereon a computer program, which when executed by the processor, causes the processor to perform operations, including:
acquiring a first photographed image that represents an inside portion of a vehicle;
identifying a driver who drives the vehicle using the first photographed image;
acquiring driver information that indicates at least one of an attribute of the identified driver and a driving history of the identified driver;
determining, using the driver information, whether or not the identified driver satisfies a condition of an experienced driver;
deciding a threshold value that is used for detection of an occurrence of an event to be a trigger of photographing or recording of a second photographed image, which represents an outside portion of the vehicle based on a result of the determining; and
recording the second photographed image that is determined to be photographed or recorded using the threshold value,
wherein the second photographed image is acquired from a photographing apparatus that photographs the outside portion of the vehicle.

* * * * *